United States Patent
Chow et al.

(10) Patent No.: US 11,110,595 B2
(45) Date of Patent: Sep. 7, 2021

(54) MAST SYSTEMS FOR AUTONOMOUS MOBILE ROBOTS

(71) Applicant: iRobot Corporation, Bedford, MA (US)

(72) Inventors: Patrick Chow, Santa Clarita, CA (US); Irene Lee, South Pasadena, CA (US); Kenneth Holm, Jr., Irvine, CA (US); Frederic D. Hook, Fontana, CA (US); Patrick Petrossian, Azusa, CA (US); Fred Alibozek, Peterborough, NH (US)

(73) Assignee: iRobot Corporation, Bedford, MA (US)

( * ) Notice: Subject to any disclaimer, the term of this patent is extended or adjusted under 35 U.S.C. 154(b) by 110 days.

(21) Appl. No.: 16/216,386

(22) Filed: Dec. 11, 2018

(65) Prior Publication Data

US 2020/0180142 A1   Jun. 11, 2020

(51) Int. Cl.
  *B25J 9/00*   (2006.01)
  *B25J 18/06*  (2006.01)
  (Continued)

(52) U.S. Cl.
  CPC .......... *B25J 9/0015* (2013.01); *B25J 9/0012* (2013.01); *B25J 9/162* (2013.01); *B25J 9/1694* (2013.01); *B25J 18/04* (2013.01); *B25J 18/06* (2013.01)

(58) Field of Classification Search
  CPC . B25J 9/0015; B25J 9/0012; B25J 8/04; B25J 18/162; B25J 9/162; B25J 18/06;
  (Continued)

(56) References Cited

U.S. PATENT DOCUMENTS

| 2,967,465 A | 1/1961 | Berenson |
| 3,144,104 A | 8/1964 | Weir |

(Continued)

FOREIGN PATENT DOCUMENTS

| EP | 1548532 | 6/2005 |
| JP | 2002046088 | 2/2002 |
| WO | WO 02/28261 A1 * | 4/2002 |

OTHER PUBLICATIONS

Define synthetic material—Google Search, Jun. 15, 2020 (Year: 2020).*

(Continued)

*Primary Examiner* — Vinh Luong
(74) *Attorney, Agent, or Firm* — Fish & Richardson P.C.

(57) ABSTRACT

An autonomous mobile robot includes a flexible member including a polymer layer extending along an entire length of the flexible member, and an end portion vertically movable away from a body of the robot. A first portion of a fastening mechanism extends along a first lateral edge of the polymer layer and a second portion of the fastening mechanism extends along a second lateral edge of the polymer layer. The first portion of the fastening mechanism is attached to the second portion of the fastening mechanism and forms a conduit to support the image capture device. The conduit includes an inner surface and an outer surface, and the outer surface of the conduit is at least partially defined by the polymer layer. An image capture device is mounted to an end portion of the flexible member.

33 Claims, 18 Drawing Sheets

(51) Int. Cl.
*B25J 18/04* (2006.01)
*B25J 9/16* (2006.01)

(58) Field of Classification Search
CPC ...... B25J 13/006; B25J 13/086; B25J 13/089;
B25J 18/007; B25J 5/007; B25J 9/1694;
B25J 18/04; B25J 19/023; B25J 18/02;
B25J 11/02; B25J 11/008; B25J 1/1679;
B25J 9/1697; B25J 9/0009; B25J 9/0003;
B25J 13/003; B25J 9/1666; F16M 11/40;
A47L 9/009; G01V 8/10; G05D 1/0022;
G05D 1/0044; G05D 1/0094; G05D
1/0212; G05D 1/0274; G05D 2201/0207;
G05D 2201/0209; G06K 19/14; G06K
7/10297; G08B 13/196; G08B 13/19647;
G08B 13/2491; Y10S 901/01; Y10S
901/46
See application file for complete search history.

(56) References Cited

U.S. PATENT DOCUMENTS

| | | | |
|---|---|---|---|
| 3,144,215 A | 8/1964 | Klien | |
| 3,252,173 A | 5/1966 | Robinsky | |
| 3,503,164 A | 3/1970 | Medal | |
| 3,696,568 A | 10/1972 | Berry | |
| 3,832,240 A | 8/1974 | Moritada | |
| 4,096,459 A | 6/1978 | Lowenhar | |
| 4,116,648 A * | 9/1978 | Busch | A47L 9/14 55/369 |
| 4,777,416 A | 10/1988 | George et al. | |
| 4,857,912 A | 8/1989 | Everett et al. | |
| 4,904,514 A * | 2/1990 | Morrison | B25J 19/0083 428/53 |
| 4,991,784 A * | 2/1991 | Schmid | B64G 9/00 242/390.3 |
| 5,084,828 A | 1/1992 | Kaufman et al. | |
| 5,199,931 A | 4/1993 | Easley | |
| 5,201,814 A | 4/1993 | Kitchell et al. | |
| 5,448,696 A | 9/1995 | Shimada et al. | |
| 5,732,401 A | 3/1998 | Conway | |
| 5,793,900 A | 8/1998 | Nourbakhsh et al. | |
| 5,802,494 A | 9/1998 | Kuno | |
| 5,808,663 A | 9/1998 | Okaya | |
| 6,208,379 B1 | 3/2001 | Oya et al. | |
| 6,217,975 B1 | 4/2001 | Daton-Lovett | |
| 6,256,938 B1 | 7/2001 | Daton-Lovett | |
| 6,272,237 B1 | 8/2001 | Hashima | |
| 6,292,713 B1 | 9/2001 | Jouppi | |
| 6,389,329 B1 | 5/2002 | Colens | |
| 6,415,203 B1 | 7/2002 | Inoue et al. | |
| 6,445,978 B1 | 9/2002 | Takamura et al. | |
| 6,454,708 B1 | 9/2002 | Ferguson et al. | |
| 6,509,926 B1 | 1/2003 | Mills et al. | |
| 6,529,234 B2 | 3/2003 | Urisaka et al. | |
| 6,532,404 B2 | 3/2003 | Colens | |
| 6,542,788 B2 | 4/2003 | Hosonuma et al. | |
| 6,594,844 B2 | 7/2003 | Jones | |
| 6,596,955 B2 * | 7/2003 | Eves | H01H 1/12 200/550 |
| 6,602,574 B1 | 8/2003 | Daton-Lovett | |
| 6,658,325 B2 | 12/2003 | Zweig | |
| 6,690,134 B1 | 2/2004 | Jones et al. | |
| 6,718,232 B2 | 4/2004 | Fujita et al. | |
| 6,781,338 B2 | 8/2004 | Jones et al. | |
| 6,809,490 B2 | 10/2004 | Jones et al. | |
| 6,914,622 B1 | 7/2005 | Smith | |
| 6,917,855 B2 | 7/2005 | Gonzalez-Banos et al. | |
| 6,965,209 B2 | 11/2005 | Jones et al. | |
| 6,980,956 B1 | 12/2005 | Takagi et al. | |
| 7,117,190 B2 | 10/2006 | Sabe et al. | |
| 7,123,285 B2 | 10/2006 | Smith et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,199,817 B2 | 4/2007 | Mottur et al. | |
| 7,228,203 B2 | 6/2007 | Koselka et al. | |
| 7,289,881 B2 | 10/2007 | Ota et al. | |
| 7,289,883 B2 | 10/2007 | Wang et al. | |
| 7,332,890 B2 | 2/2008 | Cohen et al. | |
| 7,340,100 B2 | 3/2008 | Higaki et al. | |
| 7,388,343 B2 | 6/2008 | Jones et al. | |
| 7,388,879 B2 | 6/2008 | Sabe et al. | |
| 7,388,981 B2 | 6/2008 | Jouppi | |
| 7,389,156 B2 | 6/2008 | Ziegler et al. | |
| 7,430,455 B2 | 9/2008 | Casey et al. | |
| 7,448,113 B2 | 11/2008 | Jones et al. | |
| 7,467,026 B2 | 12/2008 | Sakagami et al. | |
| 7,515,992 B2 | 4/2009 | Sawada et al. | |
| 7,551,980 B2 | 6/2009 | Sakagami et al. | |
| 7,571,511 B2 | 8/2009 | Jones et al. | |
| 7,593,546 B2 | 9/2009 | Jouppi | |
| 7,624,438 B2 | 11/2009 | White et al. | |
| 7,631,834 B1 | 12/2009 | Johnson | |
| 7,636,982 B2 | 12/2009 | Jones et al. | |
| 7,643,051 B2 | 1/2010 | Sandberg et al. | |
| 7,702,420 B2 | 4/2010 | Goto et al. | |
| 7,706,917 B1 | 4/2010 | Chiappetta et al. | |
| 7,761,954 B2 | 7/2010 | Ziegler | |
| 8,077,963 B2 | 12/2011 | Wang et al. | |
| 8,359,122 B2 | 1/2013 | Koselka et al. | |
| 8,515,577 B2 | 8/2013 | Wang et al. | |
| 8,863,369 B2 | 10/2014 | Taylor | |
| 9,168,654 B2 | 10/2015 | Briggs et al. | |
| 9,198,728 B2 | 12/2015 | Wang | |
| 9,376,600 B2 | 6/2016 | Gray | |
| 10,100,968 B1 | 10/2018 | Chow et al. | |
| 10,265,859 B2 * | 4/2019 | Deyle | B25J 11/008 |
| 10,458,593 B2 * | 10/2019 | Chow | A47L 9/2805 |
| 2001/0020837 A1 | 9/2001 | Yamashita et al. | |
| 2001/0024233 A1 | 9/2001 | Urisaka et al. | |
| 2001/0037163 A1 | 11/2001 | Allard | |
| 2002/0016649 A1 | 2/2002 | Jones | |
| 2002/0095898 A1 * | 7/2002 | Bettencourt | E04G 21/28 52/506.05 |
| 2002/0097322 A1 | 7/2002 | Monroe et al. | |
| 2002/0103576 A1 | 8/2002 | Takamura et al. | |
| 2002/0120364 A1 | 8/2002 | Colens | |
| 2002/0128746 A1 | 9/2002 | Boies et al. | |
| 2002/0165790 A1 | 11/2002 | Bancroft et al. | |
| 2002/0199007 A1 | 12/2002 | Clayton | |
| 2003/0023348 A1 | 1/2003 | Inoue et al. | |
| 2003/0025472 A1 | 2/2003 | Jones et al. | |
| 2003/0037250 A1 | 2/2003 | Walker | |
| 2003/0045203 A1 | 3/2003 | Sabe et al. | |
| 2003/0060930 A1 | 3/2003 | Fujita et al. | |
| 2003/0078696 A1 | 4/2003 | Sakamoto et al. | |
| 2003/0080545 A1 * | 5/2003 | Rosenkranz | B25J 19/0075 280/762 |
| 2003/0109960 A1 | 6/2003 | Nourbakhsh et al. | |
| 2003/0137268 A1 | 7/2003 | Papanikolopoulos et al. | |
| 2003/0151658 A1 | 8/2003 | Smith | |
| 2003/0167403 A1 | 9/2003 | McCurley | |
| 2003/0182117 A1 | 9/2003 | Monchi et al. | |
| 2003/0185556 A1 | 10/2003 | Stiepel et al. | |
| 2003/0229474 A1 | 12/2003 | Suzuki et al. | |
| 2004/0019406 A1 | 1/2004 | Wang et al. | |
| 2004/0020000 A1 | 2/2004 | Jones | |
| 2004/0049877 A1 | 3/2004 | Jones et al. | |
| 2004/0073368 A1 | 4/2004 | Gonzalez-Banos et al. | |
| 2004/0078219 A1 | 4/2004 | Kaylor et al. | |
| 2004/0089090 A1 | 5/2004 | Maeda | |
| 2004/0093650 A1 | 5/2004 | Martins et al. | |
| 2004/0102166 A1 | 5/2004 | Morita | |
| 2004/0111273 A1 | 6/2004 | Sakagami et al. | |
| 2004/0113777 A1 | 6/2004 | Matsuhira et al. | |
| 2004/0117063 A1 | 6/2004 | Sabe et al. | |
| 2004/0137911 A1 | 7/2004 | Hull et al. | |
| 2004/0174129 A1 | 9/2004 | Wang et al. | |
| 2004/0187457 A1 | 9/2004 | Colens | |
| 2004/0202351 A1 | 10/2004 | Park et al. | |
| 2004/0207355 A1 | 10/2004 | Jones et al. | |
| 2004/0210347 A1 | 10/2004 | Sawada et al. | |

(56) References Cited

U.S. PATENT DOCUMENTS

| | | |
|---|---|---|
| 2005/0009469 A1 | 1/2005 | Kotola |
| 2005/0026631 A1 | 2/2005 | Hull |
| 2005/0035862 A1 | 2/2005 | Wildman et al. |
| 2005/0046373 A1 | 3/2005 | Aldred |
| 2005/0067994 A1 | 3/2005 | Jones et al. |
| 2005/0071047 A1 | 3/2005 | Okabayashi et al. |
| 2005/0091684 A1 | 4/2005 | Kawabata et al. |
| 2005/0125098 A1 | 6/2005 | Wang et al. |
| 2005/0156562 A1 | 7/2005 | Cohen et al. |
| 2005/0171636 A1 | 8/2005 | Tani |
| 2005/0197739 A1 | 9/2005 | Noda et al. |
| 2005/0204717 A1 | 9/2005 | Colens |
| 2005/0216124 A1 | 9/2005 | Suzuki |
| 2005/0216126 A1 | 9/2005 | Koselka et al. |
| 2005/0222711 A1 | 10/2005 | Yoshimi et al. |
| 2005/0231357 A1 | 10/2005 | Kanayama et al. |
| 2005/0234729 A1 | 10/2005 | Scholl |
| 2005/0251292 A1 | 11/2005 | Casey et al. |
| 2006/0005254 A1 | 1/2006 | Ross |
| 2006/0006316 A1 | 1/2006 | Takenaka |
| 2006/0041333 A1 | 2/2006 | Anezaki |
| 2006/0047803 A1 | 3/2006 | Shaik |
| 2006/0052676 A1 | 3/2006 | Wang et al. |
| 2006/0082642 A1 | 4/2006 | Wang |
| 2006/0091297 A1 | 5/2006 | Anderson et al. |
| 2006/0129848 A1 | 6/2006 | Paksoy |
| 2006/0164280 A1* | 7/2006 | Nehls .................... G08C 17/02 341/176 |
| 2006/0195226 A1 | 8/2006 | Matsukawa et al. |
| 2006/0217837 A1 | 9/2006 | Koga et al. |
| 2006/0259193 A1 | 11/2006 | Wang et al. |
| 2006/0261207 A1 | 11/2006 | Woodruff et al. |
| 2007/0008918 A1 | 1/2007 | Stanforth |
| 2007/0027579 A1 | 2/2007 | Suzuki et al. |
| 2007/0043459 A1 | 2/2007 | Abbott et al. |
| 2007/0046237 A1 | 3/2007 | Lakshmanan et al. |
| 2007/0055116 A1 | 3/2007 | Clark et al. |
| 2007/0060105 A1 | 3/2007 | Batta |
| 2007/0061041 A1 | 3/2007 | Zweig |
| 2007/0064092 A1 | 3/2007 | Sandberg et al. |
| 2007/0198130 A1 | 8/2007 | Wang et al. |
| 2007/0266508 A1 | 11/2007 | Jones et al. |
| 2008/0055409 A1 | 3/2008 | Mars et al. |
| 2008/0140255 A1 | 6/2008 | Ziegler et al. |
| 2008/0155768 A1 | 7/2008 | Ziegler et al. |
| 2008/0167542 A1 | 7/2008 | Lampropoulos et al. |
| 2008/0215185 A1 | 9/2008 | Jacobsen et al. |
| 2008/0271669 A1* | 11/2008 | Butterworth ........... B25J 9/0012 118/300 |
| 2008/0307590 A1 | 12/2008 | Jones et al. |
| 2009/0249222 A1 | 10/2009 | Schmidt et al. |
| 2009/0292393 A1 | 11/2009 | Casey et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0277584 A1 | 11/2010 | Price |
| 2011/0012003 A1 | 1/2011 | Woodruff et al. |
| 2012/0159597 A1 | 6/2012 | Thomas et al. |
| 2012/0173018 A1 | 7/2012 | Allen et al. |
| 2012/0261156 A1* | 10/2012 | Dower .................... H02G 15/18 174/93 |
| 2013/0117867 A1 | 5/2013 | Fung |
| 2014/0009561 A1 | 1/2014 | Sutherland |
| 2014/0048672 A1 | 2/2014 | Woodruff et al. |
| 2014/0122116 A1 | 5/2014 | Smythe |
| 2014/0230949 A1 | 8/2014 | Daton-Lovett |
| 2015/0082582 A1* | 3/2015 | Whiton .................. A44B 19/26 24/418 |
| 2016/0010333 A1 | 1/2016 | Freebury |
| 2017/0225321 A1 | 8/2017 | Deyle |
| 2017/0325605 A1* | 11/2017 | Korn ........................ E06B 9/42 |
| 2019/0032842 A1 | 1/2019 | Chow et al. |
| 2019/0248002 A1* | 8/2019 | Deyle .................... B25J 13/089 |
| 2019/0289953 A1* | 9/2019 | Wright .................... A43B 7/04 |

OTHER PUBLICATIONS

Define polymer—Google Search, Jun. 15, 2020 (Year: 2020).*
Definitions controller Dictionary.com, Nov. 20, 2020 (Year: 2020).*
Define curvature—Google Search Mar. 27, 2021 (Year: 2021).*
"Facts on the Trilobite," Electrolux, accessed online <http://trilobite.electrolux.se/presskit_en/node1335.asp?print=yes&pressID=> Dec. 12, 2003, 2 pages.
"Meet iRobot, the smartest webcam on wheels," Telefriend, Wired Magazine, Issue 8.09, Sep. 2000, 4 pages.
"Welcome to the Electrolux Trilobite," Electrolux, accessed online <http://electroluxusa.com/node57.asp?currentURL=node142.asp%3F> Mar. 18, 2005, 2 pages.
Aly et al., "CompactKdt: Compact Signatures for Accurate Large Scale Object Recognition," IEEE Workshop on Applications of Computer Vision (WACV), Colorado, Jan. 2012, pp. 505-512.
Baker et al., "PCASSO: Applying and Extending State-of-the-Art Security in the Healthcare Domain," 1997 ACSA conf. Pgs.
Baltus et al., "Towards Personal Service Robots for the Elderly," Computer Science and Robotics, 2002.
Brooks, Sections from "Flesh & Machines, How Robots will Change Us" "Remote Presence," p. 131-147 Feb. 2002.
Cyberneticzoo.com, "STEM," Space Manipulartor Arm, http:cyberneticzoo.com/tag/storable-tubular-extendible-member/, 1970—"STEM" Space Manipulator Arm—George Klein, Spar Aerospace, Aug. 24, 2014.
Doty, K. L., and Harrison, R. R., "Sweep Strategies for a Sensory-Driven, Behavior-Based Vacuum Cleaning Agent," AAAI 1993 Fall Symposium Series, Instantiating Real-World Agents, Research Triangle Park, Raleigh, NC, Oct. 22-24, 1993, pp. 1-6.
Everett, H.R., "Sensors for Mobile Robots," AK Peters, Ltd., Wellesley, MA. (1995).
Goel et al., "Systematic Floor Coverage of Unknown Environments Using Rectangular Regions and Localization Certainty," 2013 IEEE/RSJ International Conference on Intelligent Robots and Systems (IROS 2013), Tokyo, Japan, Nov. 3-7, 2013, pp. 1-8.
Goncalves et al., "A Visual Front-end for Simultaneous Localization and Mapping," Proceedings of the 2005 IEEE International Conference on Robotics and Automation, Barcelona, Spain, Apr. 2005, pp. 44-49.
Gutmann et al., "A Constant-Time Algorithm for Vector Field SLAM Using an Exactly Sparse Extended Information Filter," IEEE Transactions on Robotics (vol. 28, Issue: 3), Jan. 2, 2012, pp. 650-667.
Gutmann et al., "Challenges of designing a low-cost indoor localization system using active beacons," Technologies for Practical Robot Applications (TePRA), 2013 IEEE International Conference on, Apr. 22-23, 2013, pp. 1-6.
Gutmann et al., "Localization in a vector field map," 2012 IEEE/RSJ International Conference on Intelligent Robots and Systems, pp. 3144-3151.
Gutmann et al., "The Social Impact of a Systematic Floor Cleaner," Advanced Robotics and its Social Impacts (ARSO), 2012 IEEE Workshop on, 2012, pp. 50-53.
Gutmann et al., "Vector Field SLAM," IEEE Transactions on Robotics, 2012, pp. 650-667.
Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.
Honda Motor Co., Ltd., English Translation of JP11212642, Aug. 9, 1999, 31 pages.
International Search Report and Written Opinion in International Patent Application No. PCT/US2017/59086, dated Jan. 26, 2018, 8 pages.
Jeong, WooYeon et al., "CV-SLAM: A new Ceiling Vision-based SLAM technique," 2005 IEEE/RSJ International Conference on Intelligent Robots and Systems, Aug. 2-6, 2005, pp. 3195-3200.
Jones, J., Roth, D. (Jan. 2, 2004). Robot Programming: A Practical Guide to Behavior-Based Robotics. McGraw-Hill Education TAB; 288 pages.

(56) References Cited

OTHER PUBLICATIONS

Karcher RC 3000 Robotic Cleaner, Product page, accessed online <http://www.karcher-usa.com/showproducts.php?op=view_prod&param1=143&param2=&param3=> Mar. 18, 2005, 3 pages.

Karcher RoboCleaner RC 3000, Dec. 12, 2003, 4 pages.

Karcher, Product Manual Download, 2003, 16 pages.

Karlsson et al., "The vSLAM Algorithm for Navigation in Natural Environments," Korean Robotics Society Review, vol. 2, No. 1, pp. 51-67, 2005.

Klein, "STEM" Space Manipulator Arm, Spar Aerospace (Canadian), 1970, 13 pages (Year: 1970).

Masys et al. "Patient-Centered Access to Secure Systems Online (PCASSO): A Secure Approach to Clinical Data Access via the World Wide Web," Proc pf 1997 AMIA Fall Symp. pp. 340-343.

Munich et al., "Application of Visual Pattern Recognition to Robotics and Automation," IEEE Robotics & Automation Magazine, pp. 72-77, 2006.

Munich et al., "SIFT-ing Through Features with ViPR," IEEE Robotics & Automation Magazine, Sep. 2006, pp. 72-77.

Prassler, et al., English Translation of DE19849978, Feb. 8, 2001, 16 pages.

Stanford, "Pervasive Health Care Applications Face Tough Security Challenges," Pervasive Computing, 2002 IEEE, pp. 8-12.

Urquart, "InTouch's robotic Companion 'beams up' healthcare experts", Medical Device Daily, vol. 7, No. 39, Feb. 27, 2003, p. 1, 4.

Yamamoto et al., "Optical Sensing for Robot Perception and Localization," IEEE Workshop on Advanced Robotics and its Social Impacts, 2005, Jun. 12-15, 2005, pp. 14-17.

\* cited by examiner

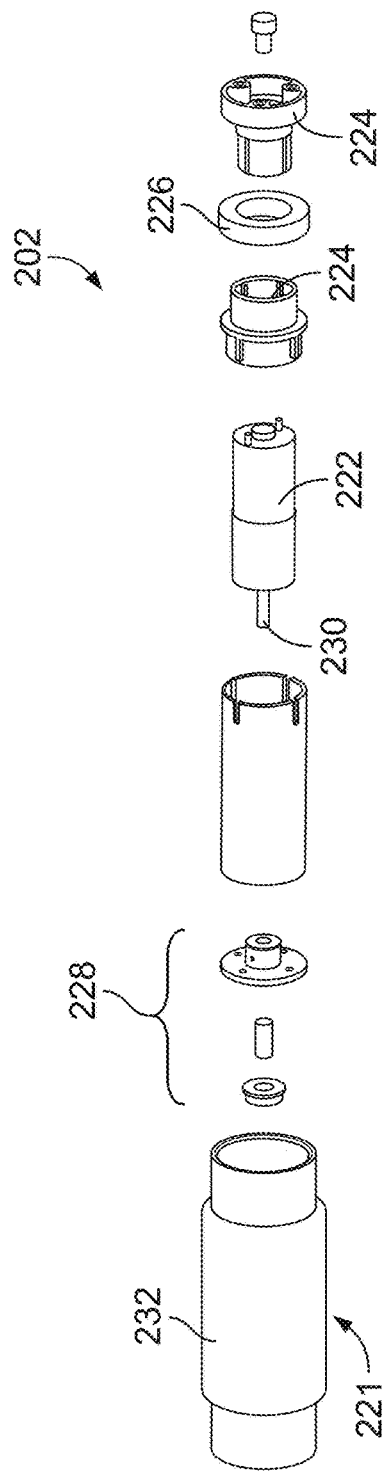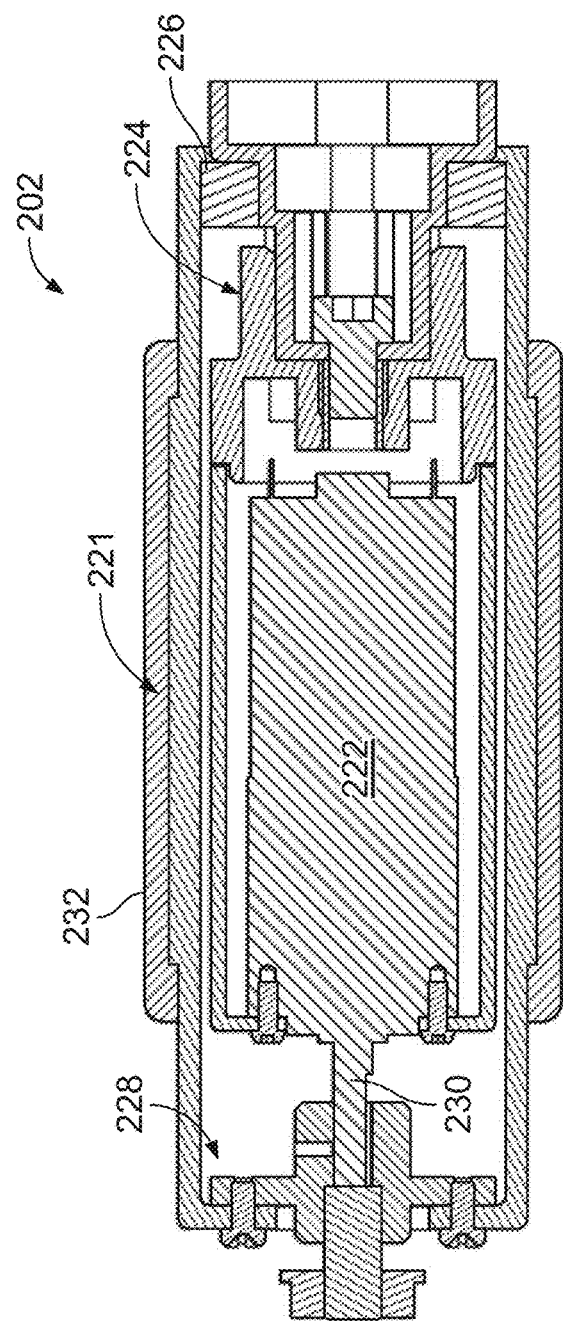
FIG. 9B
FIG. 9C

MAST SYSTEMS FOR AUTONOMOUS MOBILE ROBOTS

TECHNICAL FIELD

This specification relates to mast systems for autonomous mobile robots.

BACKGROUND

Autonomous mobile robots can be operated in environments to perform tasks such as floor cleaning, lawn mowing, or patrolling. In addition to including systems for performing these tasks, autonomous mobile robots can house drive mechanisms that propel the robots autonomously through their environments. As the robots autonomously move, the drive mechanisms can be controlled to maneuver the robots about obstacles in the environments.

SUMMARY

This application features an autonomous mobile robot with a protractible and retractable flexible member. The flexible member can include a polymer layer, one or more fabric portions, and a fastening mechanism. The polymer layer can be deflectable such that portions of the fastening mechanism can be fastened together, thereby allowing the flexible member to form a conduit. The conduit can support an image capture device of the robot that allows the robot to capture imagery of an environment as the robot travels around the environment.

Advantages of the implementations disclosed in this application include, but are not limited to, the advantages described below and herein elsewhere. The elongate flexible member can be formed of fewer materials and can include more robust connection mechanisms that are less susceptible to damage or malfunction. For example, the polymer layer is connected to fabric portions of the elongate flexible member through sewing rather than bonding or adhesive to reduce a risk of delamination.

The flexible member can be formed of materials with a lower likelihood of generating electrostatic discharge. Because the flexible member can include electrical components within the conduit formed by the flexible member in the curled configuration, the electrical components may be sensitive to the electrostatic discharge. Because woven fibers can move relative to one another and thereby generate electrostatic charge, such woven fibers can produce electrostatic discharge that could damage the electrical components. The flexible member can include less woven fabric material to reduce the likelihood of generating electrostatic discharge. In some cases, as the flexible member is retracted into and extended from the body of the robot, the flexible member can contact other components of the robot. This contact with other components and the movement of the flexible member can also generate electrostatic charge and thus can increase a likelihood of electrostatic discharge. The decreased amount of woven fabric material along an outer surface of the flexible member can further reduce a likelihood of generating the electrostatic discharge. For example, an outer surface of the flexible member can be formed of polymeric material similar to polymeric material that the flexible member contacts. This similarity of contacting materials can reduce the amount of electrostatic charge generated as the flexible member is extended or retracted.

The robot can further include several routing features that ensures that the flexible member extends along a known path through an interior of the robot. This reduces a risk of buckling or damage that could result if the flexible member were not routed in a controlled manner through the interior of the robot.

In some implementations, the robot can include a sensor that enables motion tracking of the flexible member so that the robot can more easily determine a position of the image capture device relative to a body of the robot. The sensor can also be used to determine whether the flexible member is functioning properly and whether the flexible member is being properly routed through internal components of the robot.

In one aspect, an autonomous mobile robot includes a body, a drive to maneuver the body across a floor surface, an image capture device, and an elongate flexible member. The flexible member includes a polymer layer extending along an entire length of the flexible member, and an end portion vertically movable away from the body. A first portion of a fastening mechanism extends along a first lateral edge of the polymer layer and a second portion of the fastening mechanism extends along a second lateral edge of the polymer layer. The first portion of the fastening mechanism is attached to the second portion of the fastening mechanism and forms a conduit to support the image capture device. The conduit includes an inner surface and an outer surface, and the outer surface of the conduit is at least partially defined by the polymer layer. The image capture device is mounted to an end portion of the flexible member such that the image capture device moves vertically away from the body as the end portion moves vertically away from the body.

In another aspect, a protractible and retractable mast system for an autonomous mobile robot includes an elongate flexible member and a fastening and unfastening device. The flexible member includes a polymer layer extending along an entire length of the flexible member, and an end portion. A first portion of a fastening mechanism extends along a first lateral edge of the polymer layer and a second portion of the fastening mechanism extends along a second lateral edge of the polymer layer. The first portion of the fastening mechanism is attached to the second portion of the fastening mechanism and forms a conduit to support the image capture device. The conduit includes an inner surface and an outer surface, and the outer surface of the conduit is at least partially defined by the polymer layer. The fastening and unfastening device is configured to connect the first portion of the fastening mechanism to the second portion of the fastening mechanism such that the flexible member forms the conduit as the end portion of the flexible member moves away from the fastening and unfastening device, and disconnect the first portion of the fastening mechanism from the second portion of the fastening mechanism as the end portion of the flexible member is retracted toward the fastening and unfastening device.

In some implementations, the flexible member can include a central portion and lateral portions. The central portion can include the polymer layer. The lateral portions can include first and second fabric portions extending along the first and second lateral edges, respectively, of the polymer layer. The central portion can be configured to deflect such that the first and second lateral edges are moved toward one another as the end portion of the flexible member moves away from the body.

In some implementations, the end portion can be a first end portion, and the flexible member can include a second end portion attached to a spool within the body of the robot. The flexible member can be configured to be coiled onto the spool as the first end portion moves vertically toward the body. The central portion can be configured to deflect such that the first and second lateral edges of the polymer layer are moved away from one another as the first end portion of the flexible member moves vertically toward the body.

In some implementations, a section of the flexible member can be deflectable between a flattened configuration in which the lateral portions of the flexible member along the section are separated from one another by the central portion of the flexible member along the section and a curled configuration in which the lateral portions of the flexible member are attached to one another.

In some implementations, the flexible member can include a transition region including a first end in which the first and second portions of the fastening mechanism are attached to one another and a second end in which the first and second portion of the fastening mechanism are separated from one another by at least a width of the polymer layer. A distance between the first and second portions of the fastening mechanism can decrease and a curvature of the polymer layer can increase from the first end of the transition region to the second end of the transition region.

In some implementations, the polymer layer can extend along 50% to 90% of a width of the flexible member.

In some implementations, the flexible member can include first and second fabric portions attached to the first and second lateral edges, respectively, of the polymer layer. The first and second portions of the fastening mechanism can extend along the first and second fabric portions, respectively.

In some implementations, the first and second fabric portions extend along no more than 20% of a width of the flexible member.

In some implementations, the first and second fabric portions can be sewed to the polymer layer along the first and second lateral edges, respectively, of the polymer layer.

In some implementations, the first fabric portion can sewed to the polymer layer such that an outer surface of the first fabric portion at least partially defining the outer surface of the conduit faces the outer surface of the polymer layer. The second fabric portion can be sewed to the polymer layer such that an outer surface of the second fabric portion at least partially defining the outer surface of the conduit faces the outer surface of the polymer layer.

In some implementations, the flexible member can include a metallic layer longitudinally extending along the flexible member. The robot can include a sensor to detect the metallic layer, and a controller to determine a distance travelled by the end portion of the flexible member based on the detected metallic layer.

In some implementations, the sensor can include a Hall effect sensor.

In some implementations, a width of the metallic layer can vary longitudinally along the flexible member.

In some implementations, a maximum width of the metallic layer can be between 2 and 10 centimeters, and a minimum width of the metallic layer can be between 0.1 and 5 centimeters.

In some implementations, the polymer layer can be a first polymer layer, the flexible member further can include a second polymer layer underlying the first polymer layer, and the metallic layer can be positioned between the first polymer layer and the second polymer layer.

In some implementations, an inner surface of the conduit can be at least partially defined by the metallic layer. The metallic layer can be a metallic film bonded to the polymer layer.

In some implementations, the polymer layer of the flexible member can include woven polymer fibers.

In some implementations, the polymer layer can be preformed such that a radius of curvature of the polymer layer in an unstressed state is between 10 and 60 millimeters.

In some implementations, the fastening mechanism can include a zipper mechanism. The first portion and the second portion of the fastening mechanism can correspond to first clasps and second clasps, respectively, of the zipper mechanism.

In some implementations, a gauge size of the first and second clasps is #3, #4, #5, #6, or #7.

In some implementations, a perimeter of the conduit can include a straight segment and a curved segment. The straight segment can include a first end connected to a first end of the curved segment and a second end connected to a second end of the curved segment. The polymer layer can extend along the curved segment.

In some implementations, the first and second portions of the fastening mechanism can be positioned along the straight segment.

In some implementations, a length of the straight segment can be between 2 and 50 millimeters, and a length of the curved segment can be between 4 and 10 centimeters.

In some implementations, a length of the straight segment can be between 5 and 50% of a length of the perimeter of the conduit, and a length of the curved segment can be between 50 and 95% of the length of the perimeter of the conduit.

In some implementations, the robot or the mast system can further include a drive roller including an outer surface along which the flexible member is routed, and an elongate member spring-mounted to a portion of the robot such that the elongate member is laterally movable relative to the drive roller. The elongate member can include an outer surface proximate the outer surface of the drive roller and can be configured to press the flexible member against the outer surface of the drive roller.

In some implementations, the robot or the mast system can further include a spring-mounted drive roller including an outer surface along which the flexible member is routed, the drive roller being movable laterally to press the flexible member against an elongate member.

In some implementations, the robot or the mast system can further include a passive roller including a frustoconical member at least partially defining an outer surface of the passive roller along which the flexible member is routed.

In some implementations, the robot or the mast system can further include a plug attached to the end portion of the flexible member, the plug being bonded to the end portion along at least 80% of an inner perimeter of the end portion.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 9A-9C are perspective, perspective exploded views, and front cross-sectional, respectively, of a drive roller assembly of the mast system of FIG. 4A.

DETAILED DESCRIPTION

Figures 1A, 1B:
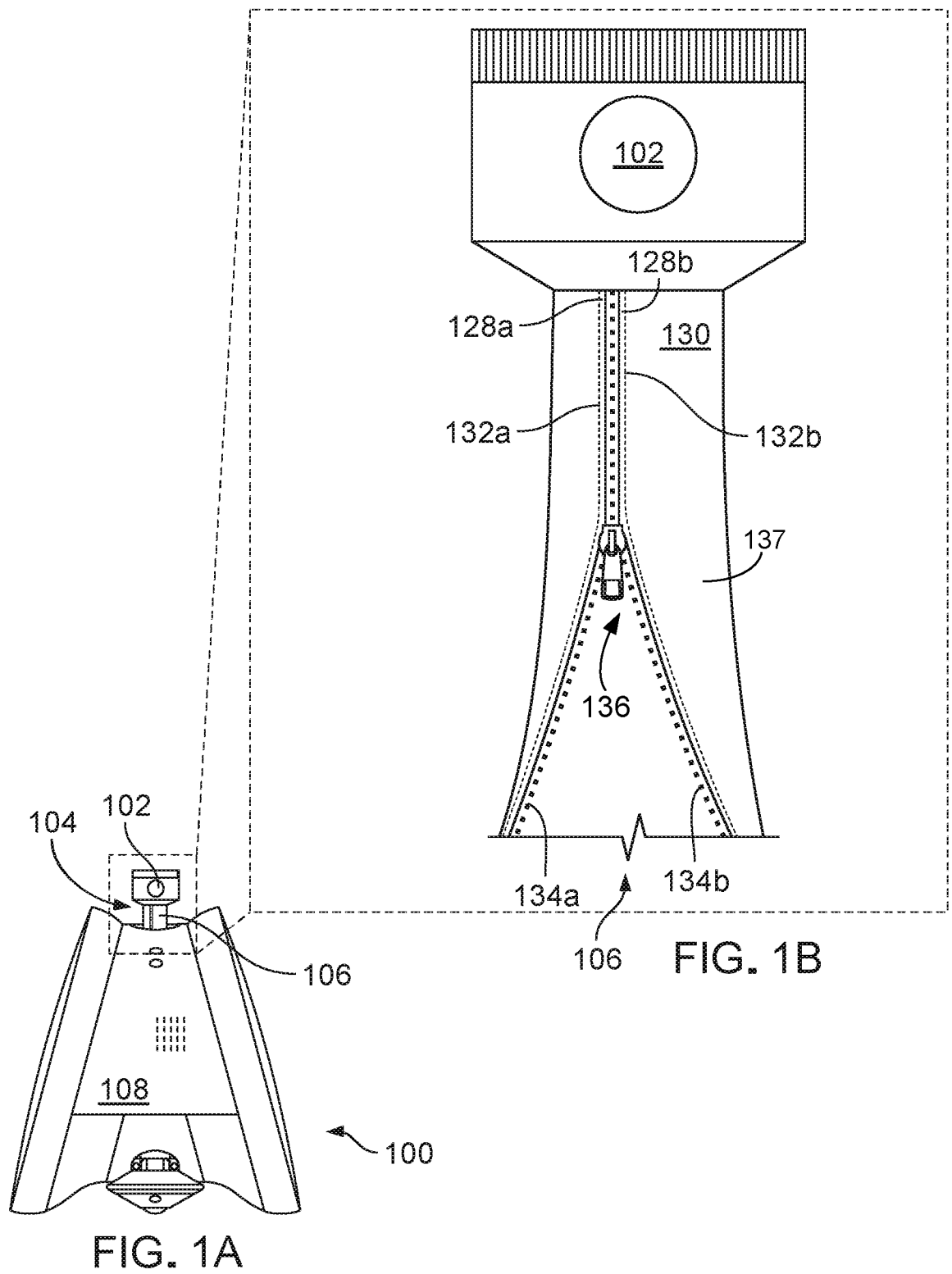
FIG. 1A is a perspective view of an image capture device coupled to an elongate flexible member.
FIG. 1B is an enlarged view of a portion of FIG. 1A.

Referring to FIG. 1, an autonomous mobile robot 100 includes an image capture device 102 and a mast system 104. The mast system 104 includes a flexible member 106 to which the image capture device 102 is mounted. The flexible member 106 is extendible from a body 108 of the robot 100 to move the image capture device 102 away from the body 108. The flexible member 106 includes a fastening mechanism including first and second fastener portions 134a, 134b attachable to one another such that the flexible member 106 forms a conduit 136 to support the image capture device 102 and to provide a pathway for electrical components, such as a cable, between the image capture device 102 and a controller of the robot 100. The first and second fastener portions 134a, 134b are attached to first and second fabric portions 128a, 128b, which in turn are attached to a polymer layer 130. The first and second fabric portions 128a, 128b extend only along a portion of an outer surface 137 of the conduit 136. The outer surface 137 of the conduit 136 can be at least partially defined by the polymer layer 130. The fabric portions 128a, 128b of the conduit 136 can be positioned along first and second lateral longitudinally extending edges 132a, 132b of the polymer layer 130 and can extend only along a portion of an outer perimeter of the flexible member 106. These features can reduce the amount of loose fabric present in the flexible member 106 and can thus reduce potential electrostatic discharge resulting from the loose fabric. In addition, the fabric portions 128a, 128b can be attached to the polymer layer 130 in such a manner to reduce a risk of delamination.

Example Monitoring Systems

Monitoring systems can be used for allowing a human user to monitor an environment, such as a home, an office, a yard, or other space. Referring to FIG. 2A, a monitoring system for an environment 10 includes the robot 100. The image capture device 102 can be a camera to capture digital imagery of the environment 10 of the robot 100. The monitoring system provides data, e.g., digital imagery data, that enables remote surveillance and monitoring of locations throughout the environment 10. The robot 100 operates in an autonomous manner without user intervention by autonomously traversing the environment 10 while capturing imagery using the image capture device 102. The image capture device 102 is moved vertically relative to a floor surface 20 to enable the image capture device 102 to capture imagery of the environment 10 at different heights. In the example depicted in FIG. 2A, the robot 100 monitors a door 30 in the environment 10 by directing its image capture device 102 at the door 30 to capture imagery of the door 30.

Figure 2B:
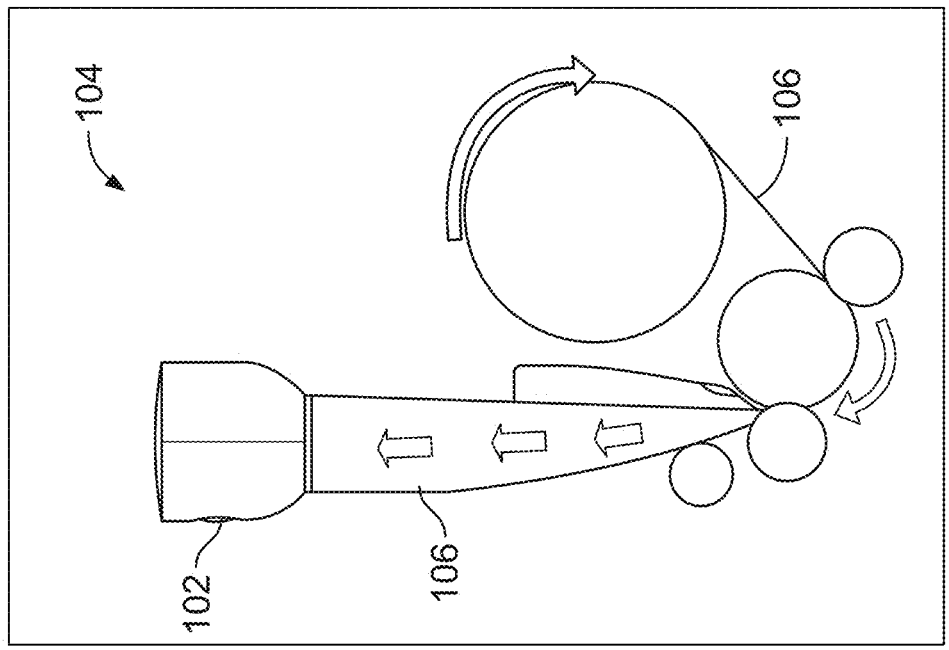
FIGS. 2B and 2D are side views of a mast system isolated from the robot of FIGS. 2A and 2C, respectively.
Figure 2A:
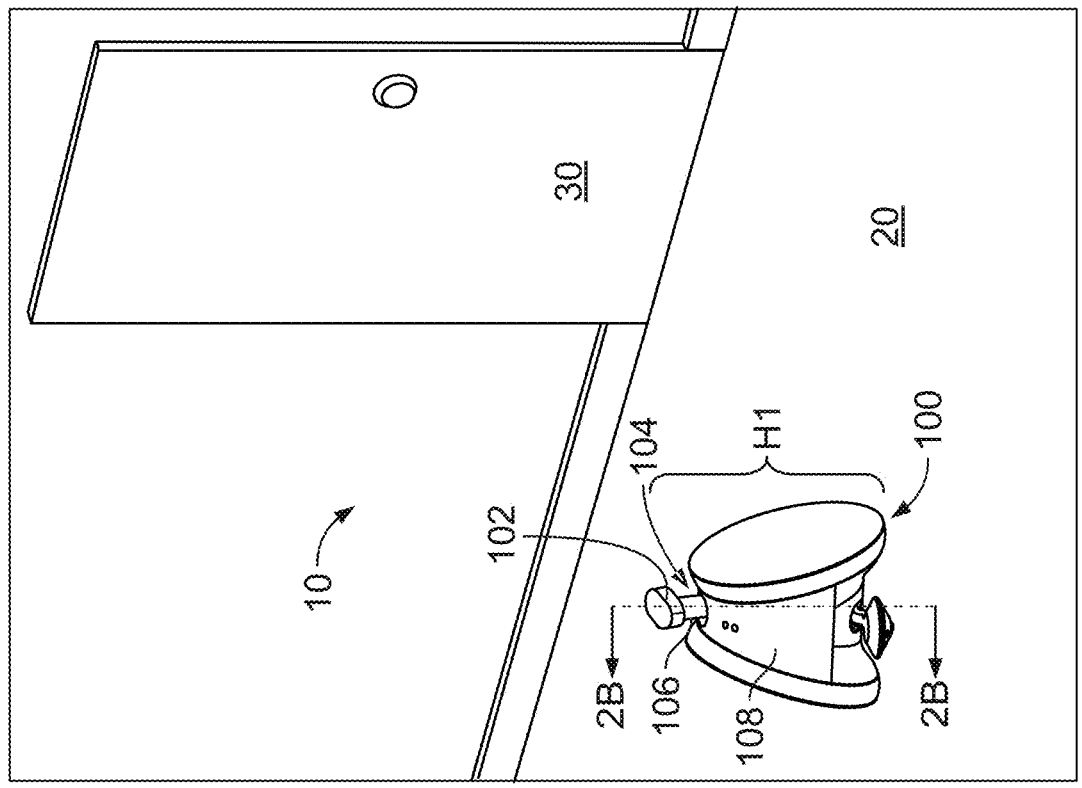
FIGS. 2A and 2C are perspective views of an autonomous mobile robot monitoring a door in an environment.

Referring also to FIG. 2B, the mast system 104 enables the image capture device 102 to be moved vertically. The mast system 104 includes a flexible member 106 that supports the image capture device 102 above a body 108 of the robot 100. The flexible member 106 is a vertically extendible member that is capable of being retracted into the body 108 or protracted from the body 108 to move the image capture device 102 to different heights.

Figure 2D:
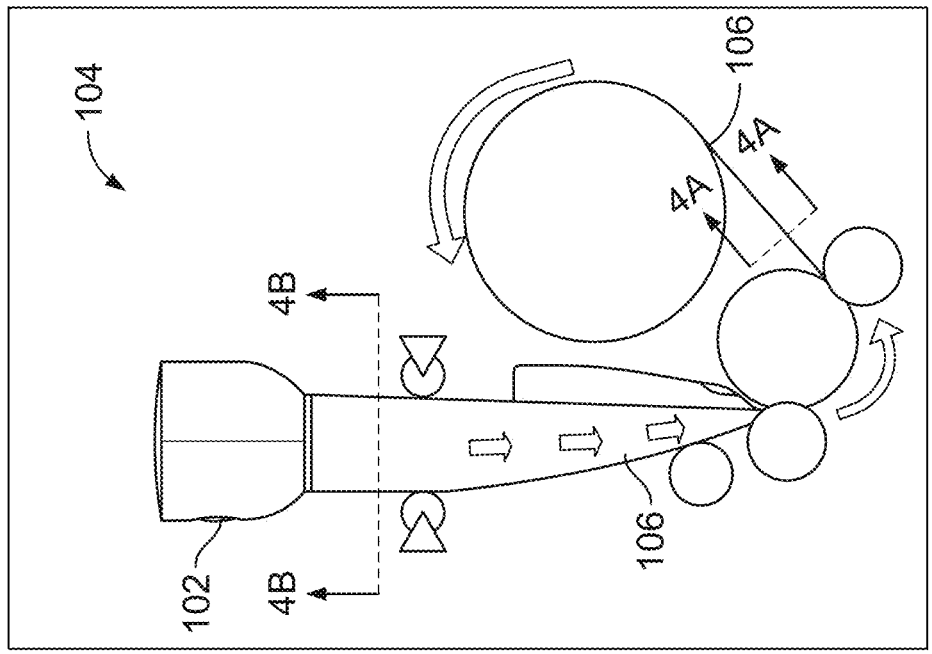
Figure 2C:
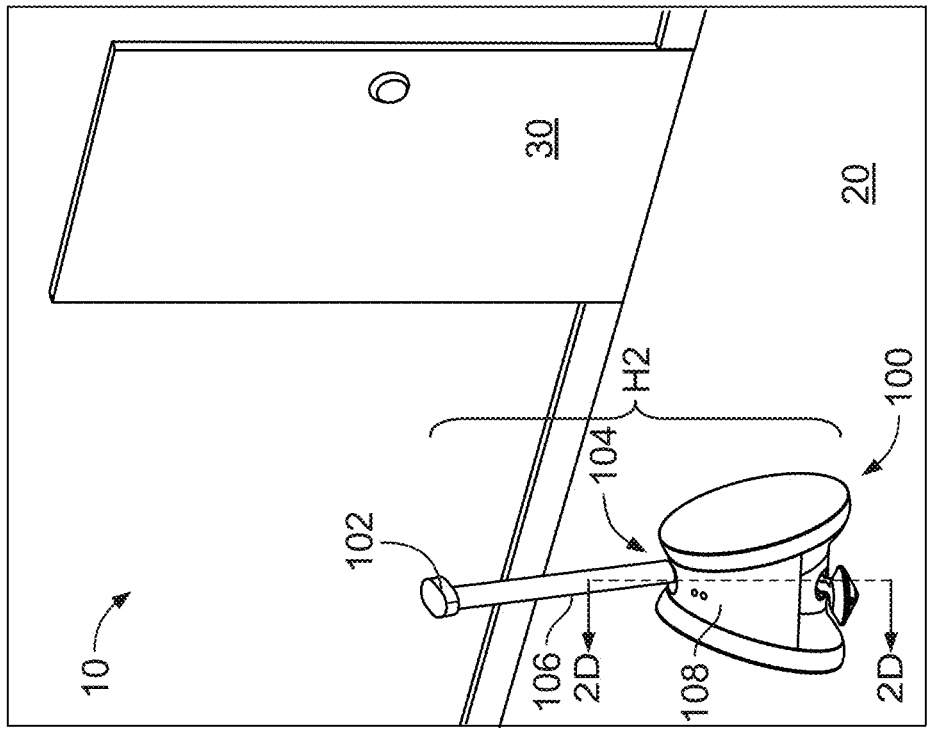

FIG. 2B shows a configuration of the mast system 104 of the robot 100 for positioning the image capture device 102 at a height H1 above the floor surface 20 as depicted in FIG. 2A. As shown in FIG. 2B, the flexible member 106 is controllable so that the image capture device 102 moves vertically (from the lower height H1 to the greater height H2 as depicted in FIG. 2C) away from the height H1, e.g., toward a height H2 depicted in FIG. 2C. FIG. 2D shows a configuration of the mast system 104 of the robot 100 in which the image capture device 102 is positioned at the height H2 above the floor surface 20 as depicted in FIG. 2C. As shown in FIG. 2D, the flexible member 106 is controllable so that the image capture device 102 moves vertically towards the floor surface 20 from the height H2, e.g., toward the height H1 (so that the image capture device 102 is lowered from the greater height H2 to the lower height H1).

As described herein, during operations to move the image capture device 102 vertically, the flexible member 106 can be drawn into or fed out of the robot 100 from a spooled configuration within the body 108 of the robot 100. By being stored in this spooled configuration, the flexible member 106 can occupy a relatively small amount of space within the body 108 of the robot 100, thus enabling the robot 100 to have a smaller overall profile.

Example Autonomous Mobile Robots

Figure 3A:
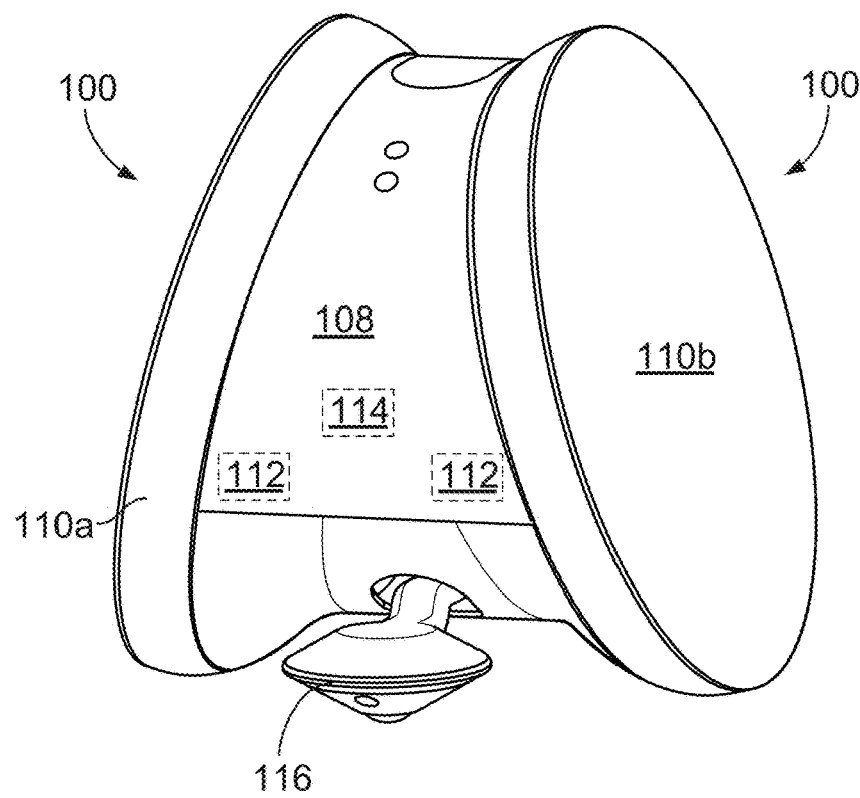
FIGS. 3A and 3B are rear perspective and bottom views of an autonomous mobile robot.

Autonomous mobile robots for monitoring systems can include image capture devices for generating digital imagery of environments of the robots. FIGS. 3A-3E illustrate an example of the robot 100. Referring to FIG. 3A, the robot 100 includes a drive that is operable to maneuver the robot 100 about a floor surface (e.g., the floor surface 20 shown in FIGS. 2A and 2C). The drive of the robot 100 includes any suitable mechanism or system for actively and controllably causing the robot 100 to transit through the environment 10. For example, the drive includes drive wheels 110a, 110b that support the body 108 of the robot 100 above the floor surface and one or more motors 112 (represented by dashed lined boxes to indicate their locations within the body 108) engaged to the drive wheels 110a, 110b. The drive wheels 110a, 110b are rotatably driven by the one or more motors 112. The one or more motors 112 are controllable by a controller 114 (represented by a dashed line box to indicate its location within the body 108) of the robot 100. In some implementations, the one or more motors 112 includes two distinct motors, with one motor being operable to control rotation of the drive wheel 110a, another motor being operable to control rotation of the drive wheel 110b.

The robot 100 has a substantially trapezoidal profile for added stability as the robot 100 transits along the floor surface 20. The body 108 houses electromechanical systems of the robot 100, including the one or more motors 112, the controller 114, portions of the mast system 104, and other systems enabling autonomous function of the robot 100. In some implementations, the electromechanical systems include a power system, a sensor system, or both. The power system includes a battery and a battery charging system configured to electrically connect the battery to a docking station. In this regard, the robot 100 is capable of operating with energy stored in the battery to move about the environment 10 and capture digital imagery and is connectable to the docking station to recharge the battery.

The sensor system includes an image sensor of the image capture device 102. In some examples, the image capture device 102 includes the image sensor, a housing for the image sensor, a lens to transmit received light from the environment 10 to the image sensor, and other components enabling operation of the image sensor for image capture.

The sensor system also includes sensors (e.g., navigation sensors) usable by the controller 114 to navigate about the environment 10. The navigation sensors generate signals for estimating a position of the robot 100 within the environment 10, for detecting objects and obstacles within the environment 10, and for generating a robot map, e.g., an occupancy map of the environment 10. These navigation sensors include, for example, dead reckoning sensors, obstacle detection and avoidance (ODOA) sensors, simultaneous localization and mapping (SLAM) sensors, etc. The navigation sensors include, in some cases, the image sensor of the image capture device 102 for visual identification of features and landmarks used in calculating robot pose on the robot map. The navigation sensors alternatively or additionally include proximity sensors, contact sensors, motion sensors, cliff sensors, or a combination thereof. The sensor system can further include sensors for monitoring the flexible member 106, e.g., for determining a position of the flexible member 106 relative to the body 108 of the robot 100.

In some implementations, the robot 100 further includes a rear stability wheel 116, e.g., a caster wheel, that extends rearward from the body 108 and cooperates with the drive wheels 110a, 110b to support the body 108 above the floor surface. In some cases, the stability wheel 116 is movable relative to the body 108, and the robot 100 includes a motor operably connected to the stability wheel 116 to move the stability wheel 116 relative to the body 108. The stability wheel 116 is movable into an interior of the robot 100.

Figure 3B:
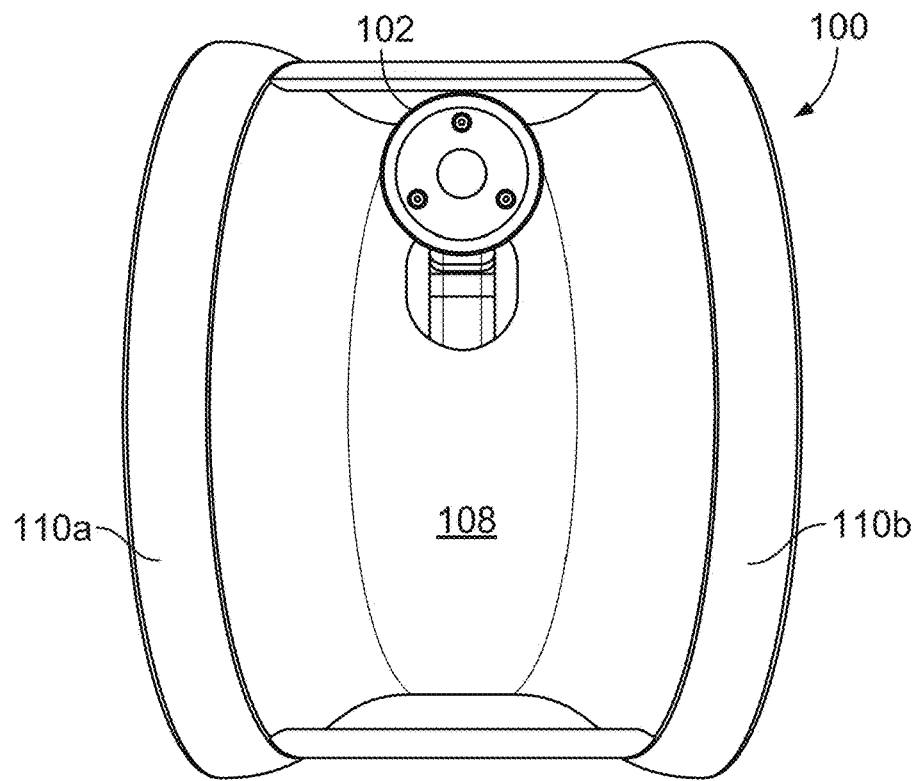

Referring to FIG. 3B, which shows a bottom view of the robot 100, a footprint of the robot 100 on the floor surface is defined by exterior components of the robot 100, such as the body 108 and the drive wheels 110a, 110b. In some examples, the area of the footprint is less than 0.5 square meters, e.g., less than 0.1 square meters, less than 0.3 square meters, less than 0.05 square meters. The smaller area footprint can enable the robot 100 to be easily stored when it is not being operated and to more easily transit between rooms of an environment. If the environment is cluttered, e.g., having many obstacles and having relatively small traversable areas, the smaller area footprint of the robot 100 can enable the robot 100 to maneuver between and around the obstacles without contacting the obstacles.

Figure 3C:
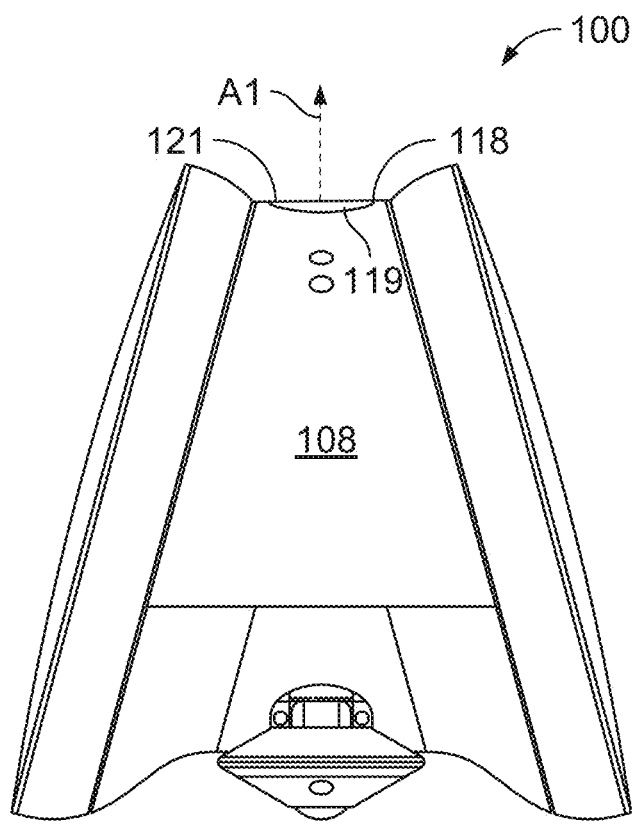
FIGS. 3C and 3D are rear views of the robot of FIG. 3A with a mast system of the robot in a retracted state and a protracted state, respectively.
Figure 3D:
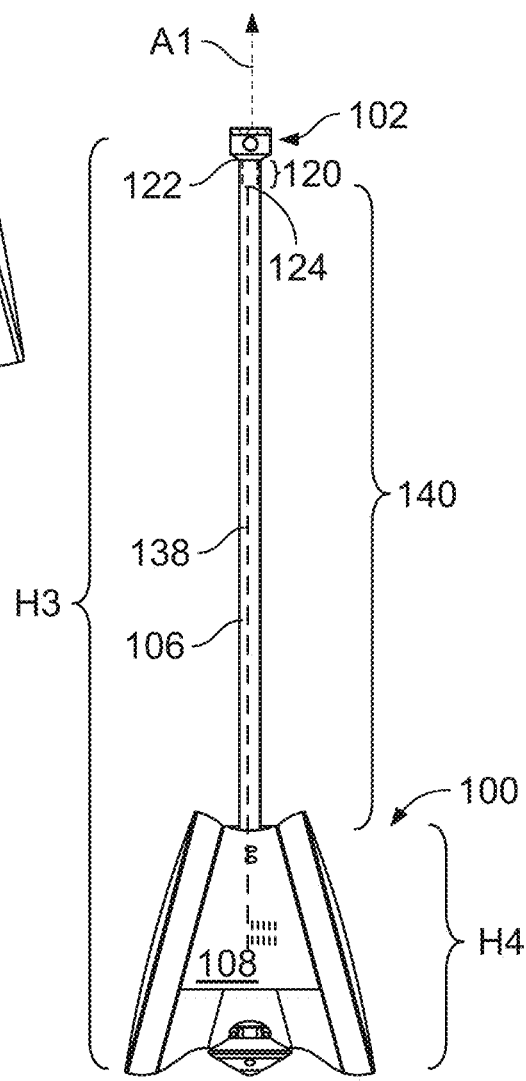

Referring to FIGS. 3C and 3D, the body 108 includes an opening 118 through which the image capture device 102 and the flexible member 106 extend from within the body 108 to outside of the body 108 or retract from outside of the body 108 to within the body 108. A distal portion 120 of the flexible member 106, e.g., a distal end of the flexible member 106, is coupled to the image capture device 102 such that movement of the distal portion 120 causes movement of the image capture device 102. For example, the flexible member 106 is attached to a housing 122 of the image capture device 102. The housing 122 is a rigid structure, e.g., formed from a metal such as aluminum or steel or formed from a rigid polymer such as a polycarbonate, acrylonitrile butadiene styrene, or nylon, that supports the image capture device 102. The distal portion 120 of the flexible member 106 is wrapped around an outer surface of a bottom portion 124 of the housing 122 to attach the flexible member 106 to the housing 122.

FIG. 3C illustrates the robot 100 with the image capture device 102 and the flexible member 106 are in fully retracted positions. When the flexible member 106 and the image capture device 102 are in the fully retracted positions, a top surface 119 of the image capture device 102 is substantially flush or entirely flush with a top surface 121 of the body 108. For example, the image capture device 102 is positioned between 0 and 1 cm from the top surface 121 of the body 108, e.g., between 0 and 0.3 cm, 0.3 cm and 0.7 cm, or 0.7 cm and 1 cm from the top surface 121 of the body 108, when the image capture device 102 is in the fully retracted position. In addition, in the fully retracted position of the flexible member 106, an image sensor of the image capture device 102 is positioned within the body 108 such that the image sensor cannot capture digital imagery of the environment 10. The image capture device 102 can be placed into the fully retracted position, for example, to provide privacy for human occupants of the environment 10. In some examples, the image capture device 102 can be placed into the fully retracted position to protect the image capture device 102 as the robot 100 traverses the environment 10 or when the robot 100 is stored. In addition, the robot 100 has a more compact profile when the image capture device 102 is fully retracted, thereby enabling the robot 100 to be more easily stored.

FIG. 3D illustrates the robot 100 when the image capture device 102 and the flexible member 106 are in fully protracted positions. The flexible member 106 and the image capture device 102 are movable along a longitudinal axis A1, e.g., a vertical axis extending through the opening 118 from which the flexible member 106 is protracted. In some examples, a maximum height H3 of the flexible member 106 above the floor surface (shown in FIG. 3D) is between 0.5 and 2.5 meters, e.g., between 0.5 and 1.5 meters, 1.0 and 2.0 meters, or 1.5 and 2.5 meters. The maximum height H3 of the flexible member 106 corresponds to the maximum height of the image capture device 102 in the fully protracted position. The body 108 of the robot 100 has a height H4 above the floor surface between 0.15 and 0.5 meters, e.g., between 0.15 and 0.3 meters, 0.15 and 0.4 meters, or 0.15 and 0.35 meters. The height H4 corresponds to the height of the image capture device 102 in the fully retracted position. The height H4 of the body 108 is between 10 and 40% of the maximum height H3 of the flexible member 106, e.g., between 10 and 30%, 15 and 35%, or 20 and 40% of the maximum height H3.

Example Mast Systems

Figure 3E:
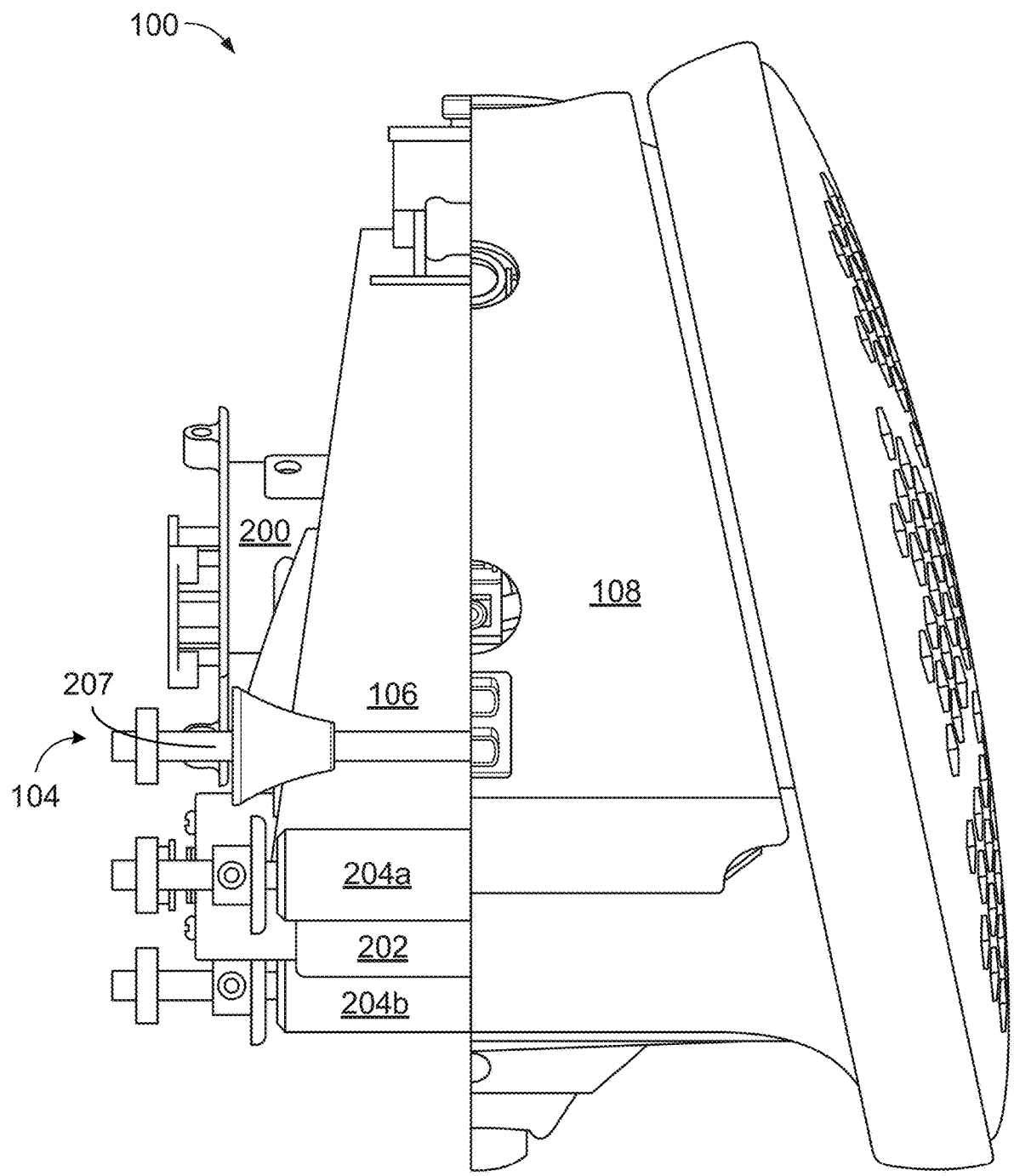
FIG. 3E is a partial cutaway front view of the robot of FIG. 3A, with a left portion of the front view showing internal components isolated from the robot and a right portion of the front view showing an exterior of the robot.

Referring to FIG. 3E, the mast system 104 includes portions housed within the body 108 that cooperate with one another to extend the flexible member 106 from the body 108 or retract the flexible member 106 into the body 108. The mast system 104 includes a spool assembly 200 and a drive roller assembly 202. In some implementations and as shown in FIG. 3E, the mast system 104 can include one or more compressing rollers 204a, 204b (collectively referred to as compressing rollers 204) and a routing roller 207. As described herein, a first end portion of the flexible member 106, e.g., the distal portion 120 (shown in FIG. 3D) of the flexible member 106, is coupled to the image capture device 102 (shown in FIG. 3D). A second end portion of the flexible member 106, e.g., a proximal portion 123 (shown in FIG. 8A) of the flexible member 106, is coupled to the spool assembly 200. The flexible member 106 extends from its distal portion 120 to its proximal portion 123, being routed through the body 108 of the robot 100 along an outer surface of the drive roller assembly 202, along outer surfaces of the one or more compressing rollers 204, and along an outer surface of the spool assembly 200. In addition, an interface cable 138 (e.g., a ribbon cable as shown in FIG. 4B) is also routed through the body 108 of the robot 100 and can be coiled about the spool assembly 200, e.g., separately from the flexible member 106. The mast system 104 is further described with respect to FIGS. 6A, 6B, 7A, 7B, 8A-8D, 9A-9C, and 10.

Referring back to FIG. 2B, the mast system 104 coils and uncoils the flexible member 106 to retract or protract, respectively, the flexible member 106. The distal portion 120 (shown in FIG. 3D) of the flexible member 106 and the image capture device 102 (shown in FIG. 3D) are retracted into the body 108 and moved vertically into the body 108 as the flexible member 106 is coiled. The distal portion 120 and the image capture device 102 are protracted from the body 108 and moved vertically away from the body 108 as the flexible member 106 is uncoiled. A lengthwise section of the flexible member 106 is capable of being coiled within the body 108 when the lengthwise section of the flexible member 106 is in a flattened configuration. The lengthwise section is deflectable between the flattened configuration and a curled configuration. As the lengthwise section of the flexible member 106 is uncoiled, the lengthwise section is transitioned from the flattened configuration to the curled configuration.

Figure 4A:
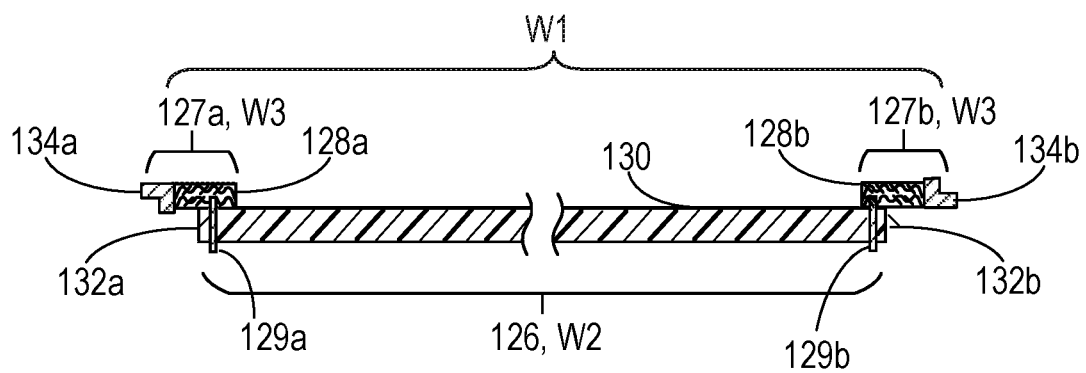
FIG. 4A is a cross-sectional view of a flexible member through section lines 4A-4A shown in FIG. 2D.
Figure 4B:
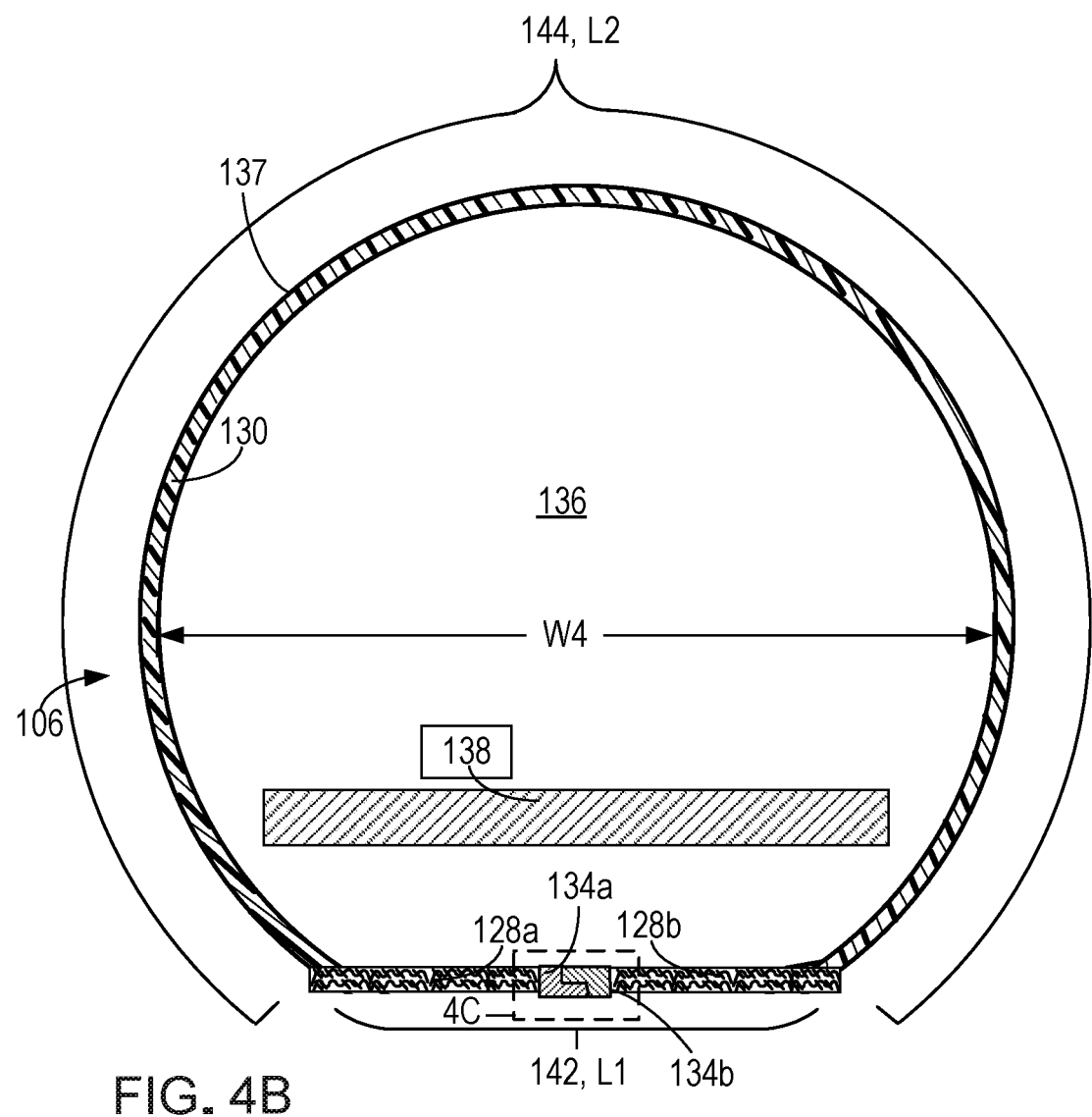
FIG. 4B is a cross-sectional view of a flexible member and an interface cable through section lines 4B-4B shown in FIG. 2D.

FIG. 4A shows a cross-section of a lengthwise section of the flexible member 106 along section lines 4A-4A in FIG. 2D according to some implementations. The lengthwise section of the flexible member 106 is in the flattened configuration. As shown in FIG. 4A, in the flattened configuration, the flexible member 106 includes a central portion 126 and first and second lateral portions 127a, 127b. The central portion 126 includes the polymer layer 130. For example, the central portion 126 can include at least some of the polymer layer 130 and can include portions of the first and second fabric portions 128a, 128b. The first and second lateral portions 127a, 127b include the first and second fabric portions 128a, 128b, respectively. The first and second fabric portions 128a, 128b extend along the first and second lateral edges 132a, 132b, respectively, of the polymer layer 130. In the first and second lateral portions 127a, 127b, the first and second fabric portions 128a, 128b, respectively, can be attached to the polymer layer 130, e.g., attached to the first and second lateral edges 132a, 132b, respectively, of the polymer layer 130. The first and second lateral portions 127a, 127b can include first and second connectors 129a, 129b that attach the first and second fabric portions 128a, 128b, respectively, to the polymer layer 130. For example, the first and second connectors 129a, 129b are strands of thread used to sew the first and second fabric portions 128a, 128b, respectively, to the polymer layer 130.

The polymer layer 130 can be configured to be stiffer than the first and second fabric portions 128a, 128b. In some examples, a material of the polymer layer 130 can be stiffer than a material of the first and second fabric portions 128a, 128b. For example, the first and second fabric portions 128a, 128b can be formed of a textile or cloth, such as a nylon, an acrylic, a canvas, or a polyester fabric. Alternatively, the first and second fabric portions 128a, 128b can be formed of a rubber or rubber-like material such as, for example, neoprene or polychloroprene. The polymer layer 130 can be formed of a polymer, such as polycarbonate, polypropylene, or polyethylene.

In some examples, the polymer layer 130 and the first and second fabric portions 128a, 128b are formed using manufacturing processes resulting in the polymer layer 130 being stiffer than the first and second fabric portion 128a, 128b. In some examples, the polymer layer 130 can support a longitudinal compressive load, and the first and second fabric portions 128a, 128b cannot support a longitudinal compressive load. For example, the polymer layer 130 can be a monolithic piece of material formed from polymer, and the first and second fabric portions 128a, 128b can be woven from multiple strands of textile or cloth material slidable relative to one another. Alternatively, the polymer layer 130 can be formed of woven polymer fibers. The polymer layer 130 can be woven from multiple polymer strands. The multiple polymer strands can be woven together, and then multiple sheets of the polymer strands can be stacked on top of one another. The polymer strands can then be melted down such that the polymer strands are not slidable relative to one another. The first and second fabric portions 128a, 128b can be woven together with multiple strands of textile or cloth material and are not melted such that the strands are slidable relative to one another.

The robot 100 includes a fastener or fastening mechanism for affixing or fastening the first and second fabric portions 128a, 128b together when the lengthwise section is curled about the longitudinal axis A1. For example, the fastener includes multiple distinct portions, with one portion being attached to the first fabric portion 128a and another portion being attached to the second fabric portion 128b. The first lateral portion 127a includes a first fastener portion 134a attached to the first fabric portion 128a, and the second lateral portion 127b includes a second fastener portion 134b attached to the second fabric portion 128b. In the flattened configuration of the lengthwise section, the first and second fastener portions 134a, 134b along the lengthwise section are positioned on lateral ends of the lengthwise section. The first and second fastener portions 134a, 134b extend along lengths of the first and second lateral edges 132a, 132b, respectively, and along lengths of the first and second fabric portions 128a, 128b, respectively.

The section of the flexible member 106 is substantially flat in the flattened configuration. To shape a lengthwise section of the flexible member 106 into the curled configuration, the central portion 126 along the lengthwise section is deflected such that the first and second lateral edges 132a, 132b of the polymer layer 130 are moved toward one another, such that the first and second lateral portions 127a, 127b are moved toward one another, and such that the first and second fastener portions 134a, 134b are moved toward one another. This causes the lengthwise section of the flexible member 106 to be curled around the longitudinal axis A1 (shown in FIGS. 3C and 3D) and causes the lateral portions 127a, 127b of the flexible member 106 to be attached to one another. The central portion 126 along the lengthwise section is deflected from the flattened configuration to the curled configuration as the distal portion 120 moves away from the body 108.

To return to the flattened configuration as the distal portion 120 moves toward the body 108, the central portion 126 along the lengthwise section is deflected such that the first and second lateral edges 132a, 132b of the polymer layer 130 are moved away from one another, such that the first and second lateral portions 127a, 127b are moved away from one another, and such that the first and second fastener portions 134a, 134b are moved away from one another. This causes the lengthwise section of the flexible member 106 to be uncurled around the longitudinal axis A1 (shown in FIGS. 3C and 3D) and causes the lateral portions 127a, 127b of the flexible member 106 along the section to be separated from one another by the central portion 126. In the flattened configuration, the first and second fastener portions 134a, 134b are separated from one another by at least a width of the polymer layer 130.

In some implementations, the fastener portions 134a, 134b form a zipper mechanism. In some examples, the zipper mechanism corresponds to a zipper mechanism for connecting garments, fabrics, and other flexible textile materials. The zipper mechanism is a standard intermeshed zipper. The zipper mechanism includes interlocking clasps arranged on both of the lateral edges 132a, 132b. A gauge size of the clasps can be between number 1 (#1) and number 10 (#10), e.g., between #1 and #7, #2 and #8, #3 and #9, or #4 and #10. The gauge size can be #3, #4, #5, #6, or #7. The fastener portion 134a corresponds to one of the sets of clasps of the zipper mechanism, and the fastener portion 134b corresponds to the other of the sets of clasps of the zipper mechanism. The fastener portions 134a, 134b are configured to be interlocked to connect the lateral edges 132a, 132b to one another.

The central portion 126 can correspond to the portion of the flexible member 106 between the connectors 129a, 129b. The first and second lateral portions 127a, 127b can correspond to the portion of the flexible member 106 between the connectors 129a, 129b and the ends of the first and second fastener portions 134a, 134b. A width W1 of the flexible member 106 is between 60 and 120 mm, e.g., between 70 and 110 mm, 80 and 100 mm, or 90 and 100 mm. A width W2 of the central portion 126 can be between 4 and 10 centimeters, e.g., between 4 and 7 centimeters, 5 and 8 centimeters, between 6 and 8 centimeters, 6 and 9 centimeters, or 7 and 10 centimeters. The width W2 of the central portion 126 can be at least 50% of the width W1, e.g., at least 60%, at least 70%, at least 80%, at least 90%, at least 95%, between 50 and 90%, between 60 and 90%, or between 70 and 90% of the width W1. A width W3 of the lateral portions 127a, 127b can be between 0.5 and 30 millimeters, e.g., between 0.5 and 10 millimeters, 10 and 20 millimeters, or 20 and 30 millimeters. The width W3 of the lateral portions 127a, 127b can be no more than 30% of the width W1, e.g., no more than 25%, no more than 20%, no more than 15%, no more than 10%, no more than 5%, between 5 and 30%, between 5 and 25%, or between 5 and 20% of the width W1.

A width of the polymer layer 130 can be between 4 and 10 centimeters, e.g., between 4 and 7 centimeters, 5 and 8 centimeters, 6 and 9 centimeters, or 7 and 10 centimeters. A width of the fabric portions 128a, 128b can be between 0.5 and 30 millimeters, e.g., between 0.5 and 10 millimeters, 10 and 20 millimeters, or 20 and 30 millimeters. In some examples, the polymer layer 128 has a thickness T1 between 0.1 and 2 mm, e.g., between 0.1 and 0.8 mm, 0.2 and 0.9 mm, 0.3 mm and 1 mm, or 1 mm and 2 mm. The fabric portions 128a, 128b have a thickness T2 between 0.1 and 1 mm, e.g., between 0.1 and 0.8 mm, 0.2 and 0.9 mm, or 0.3 mm and 1 mm.

FIG. 4B shows a cross-section of a lengthwise section of the flexible member 106 and components enclosed within the flexible member 106 along section lines 4B-4B in FIG. 2D. The lengthwise section of the flexible member 106 depicted in FIG. 4B is in the curled configuration. In the curled configuration, the flexible member 106 is curled around the longitudinal axis A1 (shown in FIGS. 3C and 3D) and forms a conduit 136 around a portion the cable 138 (illustrated in FIG. 4B as a cross section of the cable). As shown in FIG. 4B, the conduit 136 is non-cylindrical, though in other implementations, the conduit 136 may be cylindrical.

The cable 138 provides an interface between the controller 114 (shown in FIG. 3A) and the image capture device 102. For example, the cable 138 electrically connects the image capture device 102 to the controller 114 of the robot. In some implementations, the cable 138 includes a data communication cable such that data indicative of the imagery captured by the image capture device 102 is transmittable to the controller 114 and such that the controller 114 can transmit control signals to operate the image capture device 102. In some implementations, the cable 138 further includes a power cable that enables power from a power source of the robot 100 to be delivered to the image capture device 102. Referring briefly to FIG. 3D, when the image capture device 102 is protracted from the body 108, the cable 138 extends along at least a length of the protracted section of the flexible member 106, e.g., the length of the flexible member 106 between the body 108 and the image capture device 102. The cable 138 thus provides electrical communication between the image capture device 102 and the controller 114 to enable control of the image capture device 102 as the image capture device 102 is protracted from the body 108.

An outer surface 137 of the conduit 136 is visible to a human user as the robot 100 travels about the environment 10 (shown in FIG. 2A) with the flexible member 106 at least partially extended from the body 108 of the robot 100. The outer surface 137 is at least partially defined by the polymer layer 130. In the example depicted in FIG. 4B, the outer surface 137 is at least partially defined by the polymer layer 130, the first and second fabric portions 128a, 128b, and the first and second fastener portions 134a, 134b.

A perimeter of the conduit 136 includes a straight segment 142 and a curved segment 144. The straight segment 142 of the perimeter includes first and second ends connected to first and second ends, respectively, of the curved segment 144 at points 146a, 146b, respectively. The points 146a, 146b can be coincident with the first and second lateral edges 132a, 132b of the polymer layer 130. For example, in implementations in which the first and second fabric portions 128a, 128b are less stiff than the polymer layer 130 and are unable to support compressive loads, the first and second fabric portions 128a, 128b are not deflectable into curved configurations. The first and second fabric portions 128a, 128b instead can form the straight segment 142 between the first and second ends of the curved segment 144, and can be positioned along the straight segment 142. The straight segment 142 is formed by the first and second fabric portions 128a, 128b but is not formed by the polymer layer 130. The straight segment 142 can be further formed by the fastener portions 134a, 134b.

Because the polymer layer 130 is stiffer than the first and second fabric portions 128a, 128b and supports compressive loads, the polymer layer 130 is deflectable into the curved configuration and thus can form the curved segment 144. In some implementations, only a portion of the first and second fabric portions 128a, 128b extends along the straight segment 142 because another portion of the first and second fabric portions 128a, 128b radially overlaps with the polymer layer 130 and thus extends along the curved segment 144. The curved segment 144 can be formed by the polymer layer 130 and the portion of the first and second fabric portions 128a, 128b radially overlapping with the polymer layer 130.

The dimensions of the conduit 136 can vary in implementations. In some examples, the conduit 136 has a width W4 between 0.5 cm and 2.5 centimeters, e.g., between 0.5 and 2 centimeters, 0.75 and 1.5 centimeters, or 1 and 1.25 centimeters. A length of the perimeter of the conduit 136 can be between 3 and 20 centimeters, e.g., between 3 and 15 centimeters, 4.5 and 12 centimeters, or 5 and 10 centimeters. The length of the perimeter can be equal to or less than the width W1 (shown in FIG. 4A) of the flexible member 106 in the flattened configuration. The length of the perimeter can be less than the width W1, for example, if the fastener portions 134a, 134b overlap in the curled configuration of the flexible member 106. The length of the perimeter can be no less than 95% than the width W1. The length of the perimeter can also be equal a sum of a length L1 of the straight segment 142 and a length L2 of the curved segment 144. The length L1 of the straight segment 142 can be between 2 and 60 millimeters, e.g., between 2 and 20 millimeters, 5 and 25 millimeters, 10 and 30 millimeters, 15 and 35 millimeters, 20 and 40 millimeters, 25 and 45 millimeters, 30 and 50 millimeters, or 40 and 60 millimeters. The length L1 of the straight segment 142 can be between 5 and 50% of the width W1 of the flexible member 106 in the flattened configuration, e.g., between 5 and 15%, 5% and 25%, 10% and 30%, 15% and 35%, 20% and 40%, 25% and 45%, or 30% and 50% of the width W1 of the flexible member 106 in the flattened configuration. The length L2 of the curved segment 144 between 4 and 10 centimeters, e.g., between 4 and 7 centimeters, 5 and 8 centimeters, 6 and 9 centimeters, or 7 and 10 centimeters. The length L2 of the curved segment 144 can be between 50 and 95% of the width W1 of the flexible member 106, e.g., between 50 and 70%, 55% and 75%, 60% and 80%, 65% and 85%, 70% and 90%, or 75% and 95% of the width W1 of the flexible member 106.

The length L1 of the straight segment 142 and the length L2 of the curved segment 144 can be selected to achieve a certain overall stiffness of the flexible member 106 in the curled configuration and to achieve a certain overall robustness of the fastener. For example, a high length L1 of the straight segment 142, and hence greater amounts of the first and second fabric portions 128a, 128b, relative to the width W1 of the flexible member 106 compared to a low length L1 of the straight segment 142 relative to the width of the flexible member 106 can result in lower relative stiffness (e.g., more compliance) of the flexible member 106 and higher robustness for the fastener. The flexible member 106 can be relatively less stiff because the first and second fabric portions 128a, 128b in the straight segment 142 can be less capable of supporting compressive loads. The relatively lower stiffness can result in the flexible member 106 being able to support a relatively lower weight, e.g., a lower weight image capture device. The fastener can be more robust because of the flexibility of the first and second fabric portions 128a, 128b. The fastener portions 134a, 134b tend to be less susceptible to damage because the first and second fabric portions 128a, 128b can absorb forces on the flexible member 106. The fastener portions 134a, 134b can be less likely to experience wear. A low length L1 of the straight segment 142 relative to the width W1 of the flexible member 106 compared to a high length L1 of the straight segment 142 relative to the width W1 of the flexible member 106 can result in higher relative stiffness (e.g., less compliance) of the flexible member 106 and lower robustness of the fastener. The flexible member 106 can be relatively more stiff because the first and second fabric portions 128a, 128b in the straight segment 142 can be more capable of supporting compressive loads. The relatively higher stiffness can result in the flexible member 106 being able to support a relatively higher weight, e.g., a higher weight image capture device. The fastener can be less robust because of the relative inflexibility of the polymer layer 130. The fastener portions 134a, 134b tend to be more susceptible to damage because the first and second fabric portions 128a, 128b can absorb less force on the flexible member 106 than in cases with longer straight segments. The fastener portions 134a, 134b can be more likely to experience wear.

Figure 4C:
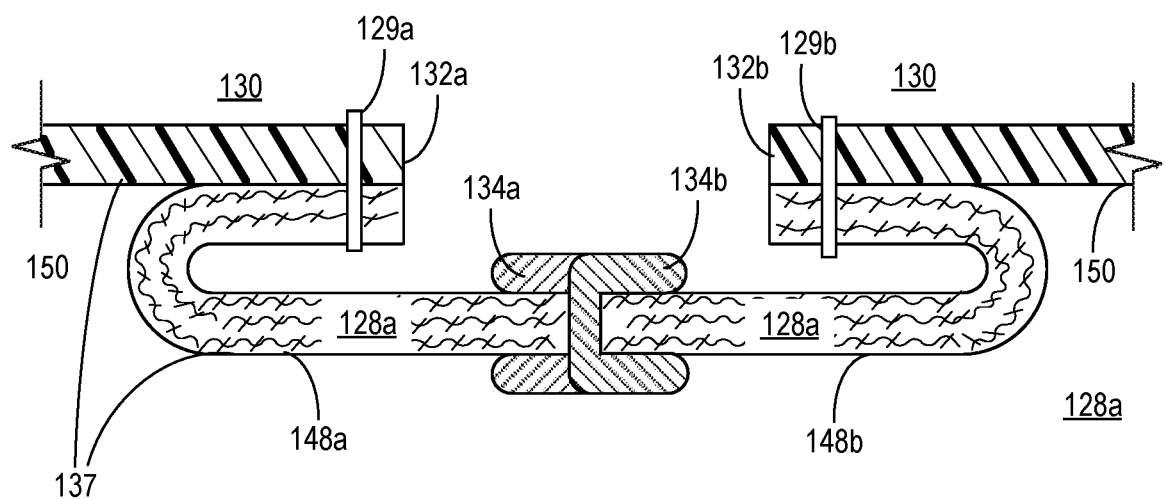
FIG. 4C is an enlarged view of an inset 4C shown in FIG. 4B.

FIG. 4C depicts an example of the first and second fabric portions 128a, 128b attached to the polymer layer 130. For example, FIG. 4C depicts an enlarged version of the portion of the lengthwise section in the inset 4C shown in FIG. 4A. The first and second fabric portions 128a, 128b, in some implementations, can be sewn to the polymer layer 130. The connectors 129a, 129b can include one or more strands of thread used to sew the first and second fabric portions 128a, 128b to the polymer layer 130. The first and fabric portions 128a, 128b are sewed to the polymer layer 130 near the first and second lateral edges 132a, 132b, respectively, of the polymer layer 130 and along no less than 90% of entire lengths of the lateral edges 132a, 132b of the polymer layer 130.

In the example depicted in FIG. 4C, the first and second fabric portions 128a, 128b are attached to the polymer layer 130 with the first and second fabric portions 128a, 128b bent over themselves so that the first and second fastener portions 134a, 134g face one another. For example, the first and second fabric portions 128a, 128b can be sewed to the polymer layer 130 such that outer surfaces 148a, 148b of the first and second fabric portions 128a, 128b at least partially defining the outer surface 137 of the conduit 136 faces an outer surface 150 of the polymer layer 130. For example, in the curved configuration of the lengthwise section, the first and second fabric portions 128a, 128b extend circumferentially in a first direction and then extend circumferentially in a second direction opposite the first direction, thereby terminating with the fastener portions 134a, 134b, respectively, at ends of the first and second fabric portions 134a, 134b. The first and second fabric portions 128a, 128b extend circumferentially in the first direction to the connectors 129a, 129b, respectively, and then extend circumferentially in the second direction from the connectors 129a, 129b, across the connectors 129a, 129b, and to the first and second fastener portions 134a, 134b, respectively. Along the portions of the first and second fabric portions 128a, 128b extending in the first direction, the outer surfaces 148a, 148b of the first and second fabric portions 128a, 128b face the outer surface 150 of the polymer layer. And along the portions of the first and second fabric portions 128a, 128b extending in the second direction, the outer surfaces 148a, 148b of the first and second fabric portions 128a, 128b face away from the outer surface 150 of the polymer layer and at least partially define the outer surface 137 of the conduit 136.

Figure 5:
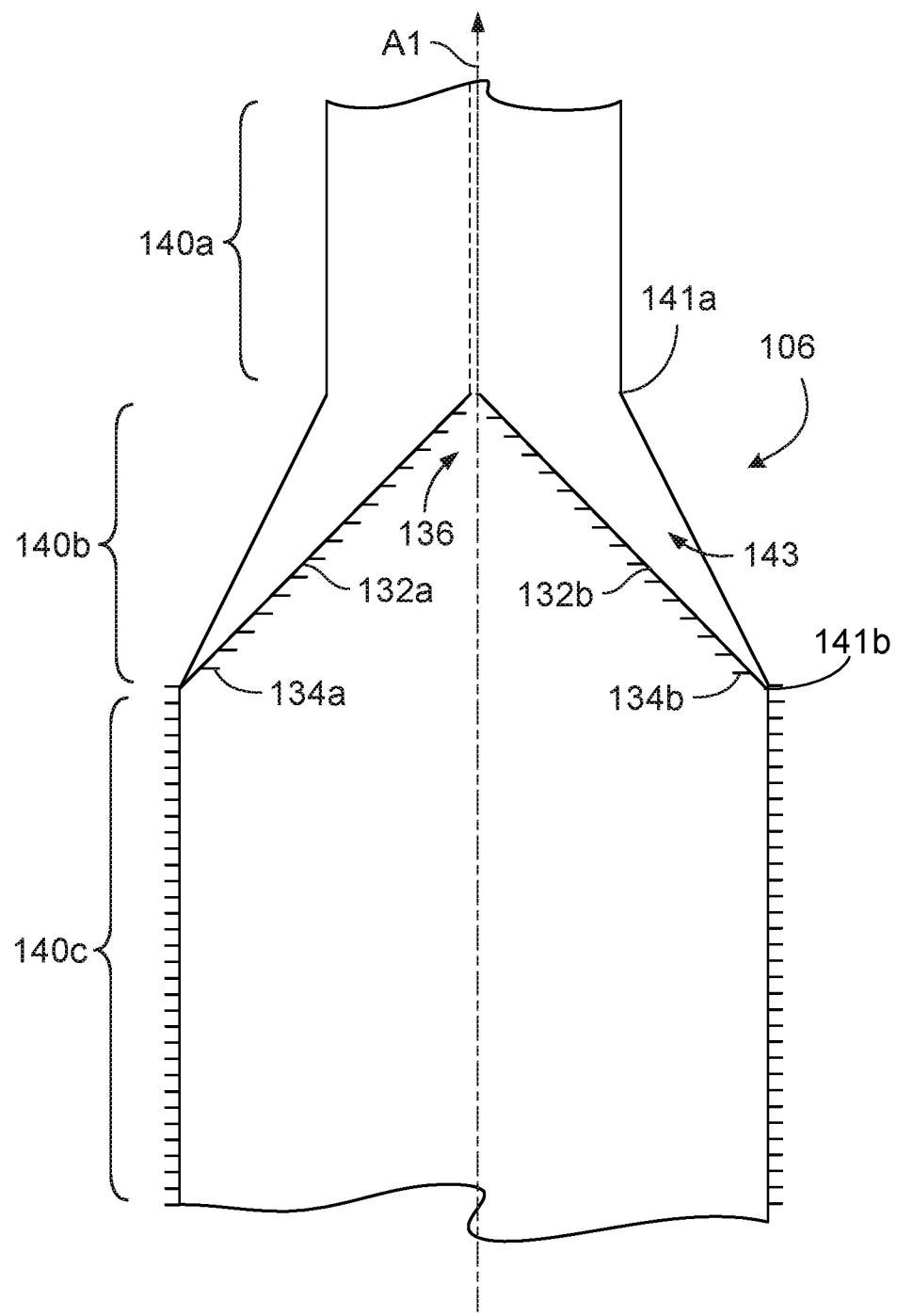
FIG. 5 is a front view of a flexible member.

FIG. 5 shows multiple lengthwise sections 140a, 140b, 140c of the flexible member 106 illustrating the transition from the flattened configuration to the curled configuration (and vice versa). The lengthwise sections 140a, 140b, 140c are positioned along the longitudinal axis A1. Only portions of the section 140a and the section 140c are visible in FIG. 5. The section 140a is arranged in the curled configuration, and the section 140c is arranged in the flattened configuration. The section 140a extends at least from the distal portion 120 (shown in FIG. 3D) to proximate the body 108 (shown in FIG. 3A). The section 140a, in the curled configuration, surrounds a portion of the cable 138 (shown in FIG. 4B) extending out of the body 108, e.g., due to protraction of the image capture device 102 out of the body 108.

Along the section 140a to form the conduit 136, the fastener portion 134a is connected to the fastener portion 134b. This thereby connects the first and second lateral edges 132a, 132b (shown in FIGS. 4A-4C) of the polymer layer 130 along the section 140a as the flexible member 106 is uncoiled. When the first and second lateral edges 132a, 132b along the section 140a of the flexible member 106 are connected to one another, due to the rigidity of the polymer layer 130 and the relatively lower rigidity of the first and second fabric portions 128a, 128b, the section 140a forms a non-circular, D-shaped perimeter. In this curled configuration, the flexible member 106 is rigid and capable of supporting the image capture device 102 above the body 108 of the robot 100 without collapsing or buckling when the distal portion 120 and the image capture device 102 are moved away from the body along the longitudinal axis A1 (shown in FIGS. 3C and 3D). In particular, the flexible member 106 has a buckling strength in the curled configuration higher than a buckling strength in the flattened configuration. In some implementations, the wall thickness of the flexible member 106 is enlarged without an increase in diameter of the curled formation of the extended flexible member 106, thereby increasing resistance to buckling under an increased weight of a payload atop the flexible member 106. In some implementations, the payload is the image capture device 102, and in other implementations, the payload may be larger, heavier payloads, such as, for example, a wireless router, a router repeater, a wirelessly connected audio media device, or a tablet and/or telephony device. For example, the ratio of wall thickness to diameter of the extended, curled flexible member 106 may be at or between 1:5 and 1:20, e.g., between 1:7 and 1:18, 1:8 and 1:16 and 1:9 and 1:14.

The section 140c of the flexible member 106, in the flattened configuration, is flattened so that it can be coiled within the body 108. As described herein, a lengthwise section of the flexible member 106 can be unfurled and transitioned from a curled configuration to a flattened configuration in a transition region. In this transition region, the section 140b of the flexible member 106 is in a transition state between the curled configuration and the flattened configuration in which the section 140b of the flexible member 106 is curled about the longitudinal axis A1 but has a smaller curvature 143 than the section 140a of the flexible member 106 and a larger curvature 143 than the section 140c of the flexible member 106. The curvature 143 of the section 140b decreases from a first end 141 a connected to the section 140a to a second end 141 b connected to the section 140c (and increases from the second end 141 b to the first end 141 a). Furthermore, a distance between the first and second fastener portions 134 a, 134 b along the section 140b increases from the first end 141 a to the second end 141 b (and decreases from the second end 141 b to the first end 141 a). In this regard, the portion of the section 140b closer to the section 140c is flatter than the portion of the section 140b closer to the section 140a. If the flexible member 106 is uncoiled, at least a portion of the section 140b is transitioned to the curled configuration. If the flexible member 106 is coiled, at least a portion of the section 140b is transitioned to the flattened configuration.

Figure 6A:
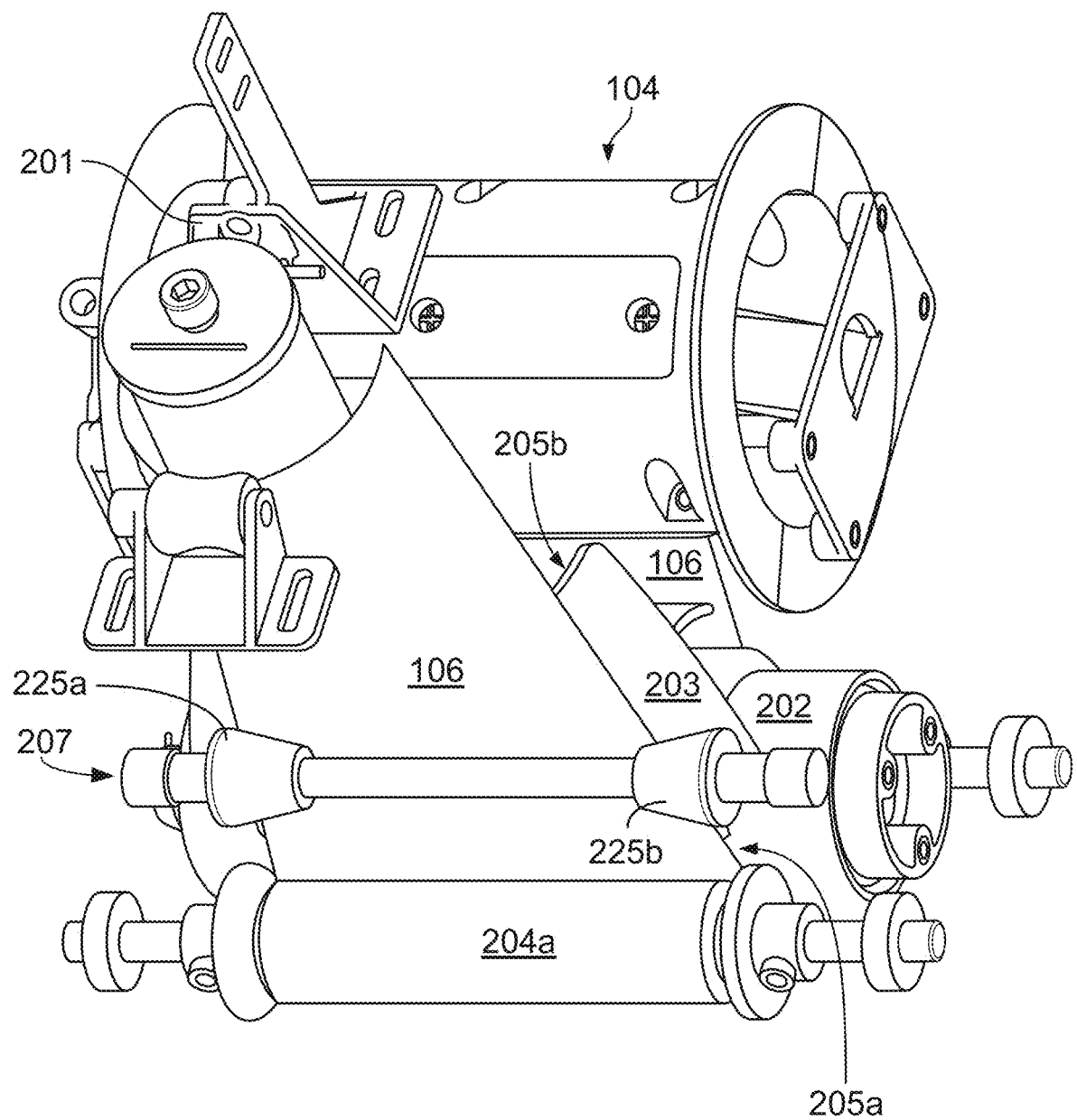
FIGS. 6A and 6B are perspective and side views, respectively, of a mast system.
Figure 6B:
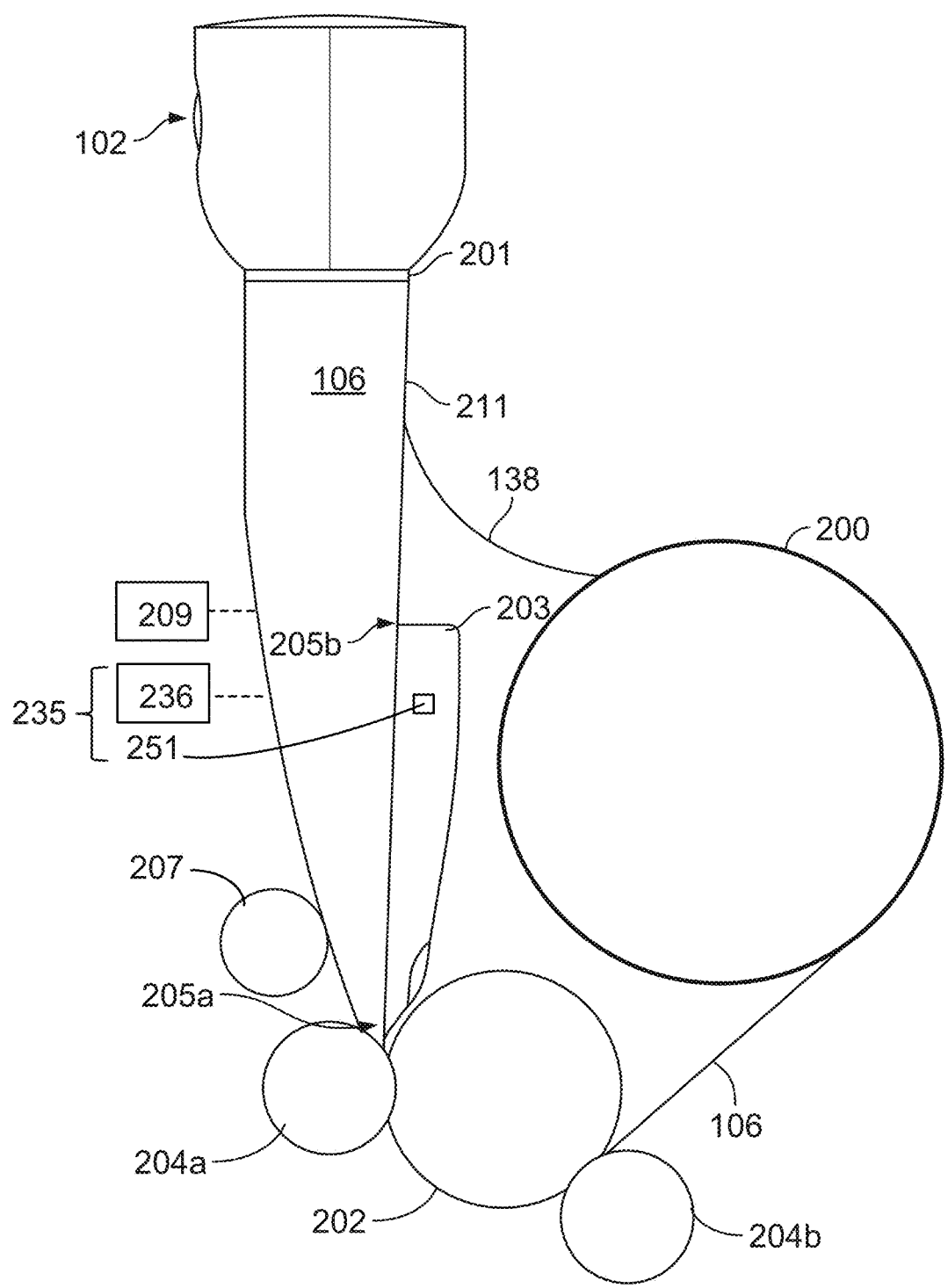

FIGS. 6A and 6B illustrate an example of a mechanism of the mast system 104 to coil the flexible member 106 while unfastening the lateral edges 132a, 132b of the flexible member 106 or to uncoil the flexible member 106 while fastening the lateral edges 132a, 132b of the flexible member 106. The mast system 104 includes a fastening and unfastening device 201 positioned below a top surface of the body 108, e.g., the top surface 121 of the body 108 (shown in FIG. 3C). For example, if the fastener is a zipper mechanism, the device 201 is configured to engage the first fastener portion 134a and the second fastener portion 134b to zip the fastener portion 134a, 134b, thereby connecting the lateral edges 132a, 132b of the flexible member 106. The device 201 causes, one-by-one, clasps of the first fastener portion 134a to be engaged to clasps of the second fastener portion 134b. In some implementations, the device 201 is a passive device. For example, the device 201 is stationary and passively engaged to the flexible member 106 as the flexible member 106 moves along the device 201. For example, in some implementations, the first and second fastener portions 134a, 134b are series of clasps of a zipper and the device 201 is a stationary protrusion holding the zipper slider within the body 108 of the robot 100 so that the clasps enmesh and unzip as the flexible member 106 extends and protracts (e.g., furls and unfurls). Alternatively or additionally, the device 201 is an active device. For example, the device 201 includes an actuator configured to actuate the device 201. The controller 114 is configured to control the actuator to engage the first and second fastener portions 134a, 134b such that the first and second fastener portions 134a, 134b are connected to one another.

The device 201 is configured to connect the first fastener portion 134a with the second fastener portion 134b to form the conduit 136 when the distal portion 120 of the flexible member 106 and the image capture device 102 (not shown in FIG. 6A but shown in FIG. 6B) are extended away from the body 108. When a portion of the flexible member 106 is protracted from the body 108, the device 201 connects the first and second fastener portions 134a, 134b at least along a length of the protracted portion of the flexible member 106. The device 201 is also configured to disconnect the first fastener portion 134a with the second fastener portion 134b when the distal portion 120 and the image capture device 102 are retracted toward the body 108. When a portion of the flexible member 106 is retracted into the body 108, the device 201 disconnects the first and second fastener portions 134a, 134b at least along a length of the retracted portion of the flexible member 106.

The mast system 104 includes a ramp 203 shaped to facilitate transition of a section of the flexible member 106 from the flattened configuration to the curled configuration when the distal portion 120 is extended from the body 108 or from a curled configuration to a flattened configuration when the distal portion 120 is retracted toward the body 108. The ramp 203 is positioned along the transition region for the flexible member 106 (discussed in connection with FIG. 5).

In some implementations, the ramp 203 is a rigid structure that shapes the flexible member 106 as the flexible member 106 passes over the ramp 203. The ramp 203 extends away from the drive roller assembly 202 from a first end 205a proximate the drive roller assembly 202 to a second end 205b proximate a location on the body 108 through which the flexible member 106 is movable to an exterior of the body 108, e.g., proximate the opening 118. Tension in the flexible member 106 tends to draw the flexible member 106 against the ramp 203. The ramp 203 encourages the flexible member 106 to curl into the curled configuration as the flexible member 106 is extended from the body 108, and encourages the flexible member 106 to flatten into the flattened configuration as the flexible member 106 is retracted into the body 108. The ramp 203 is configured to contact the flexible member 106 to inhibit the flexible member 106 from buckling and to control the curvature of the flexible member 106 as the flexible member 106 is moved along the ramp 203. In this regard, a curvature of the ramp 203 increases along a length of the ramp 203 from the first end 205a toward the second end 205b of the ramp 203.

In some implementations, the ramp 203 matches a shape of the flexible member 106 in the transition region. For example, the lengthwise section 140b (shown in FIG. 5) can have a natural shape resulting from the transition from the flattened configuration at the second end 141b to the curled configuration at the first end 141a. The ramp 203 can be shaped to match this shape of the lengthwise section 140b such that the force exerted by the ramp 203 is lower than in cases in which the ramp 203 causes the flexible member 106 to occupy a particular shape.

In addition, the ramp 203 serves to separate the flexible member 106 from the cable 138. The cable 138 is separated from the flexible member 106 at a location above the ramp 203. As a result, the flexible member 106 follows a path from the opening 118 to the spool assembly 200 distinct from a path of the flexible member 106 from the opening 118 to the spool assembly 200. The path for the flexible member 106 extends from the opening 118 (shown in FIG. 3C), along the ramp 203, the drive roller assembly 202, and the compressing rollers 204a, 204b, and to the spool assembly 200. The path for the cable 138 extends from the opening 118 directly to the spool assembly 200, e.g., above the ramp 203. As a result, the cable 138 can be separately spooled from the flexible member 106 on the spool assembly 200, thereby preventing the cable 138 and the 106 from becoming entangled.

The robot 100 includes a rigid nest 211 positioned within the body 108 of the robot 100 to receive the image capture device 102. In particular, the rigid nest 211 receives the image capture device 102 when the image capture device 102 is in the fully retracted position. The rigid nest 211 defines the fully retracted position of the image capture device 102 by inhibiting further retraction of the image capture device 102.

Figure 7A:
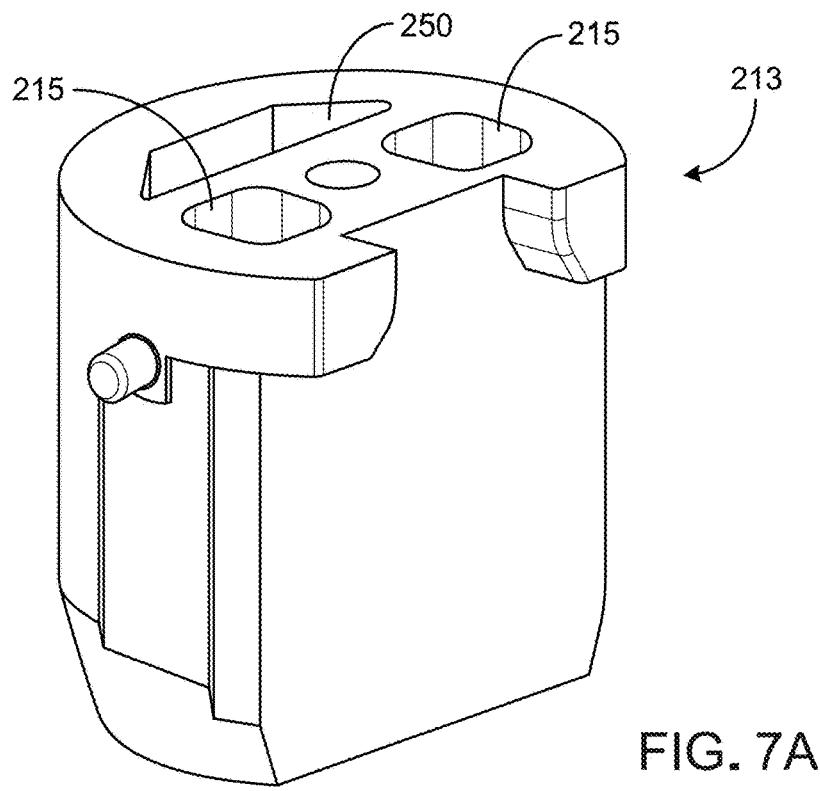
FIG. 7A is a perspective view of a plug member for a flexible member.
Figure 7B:
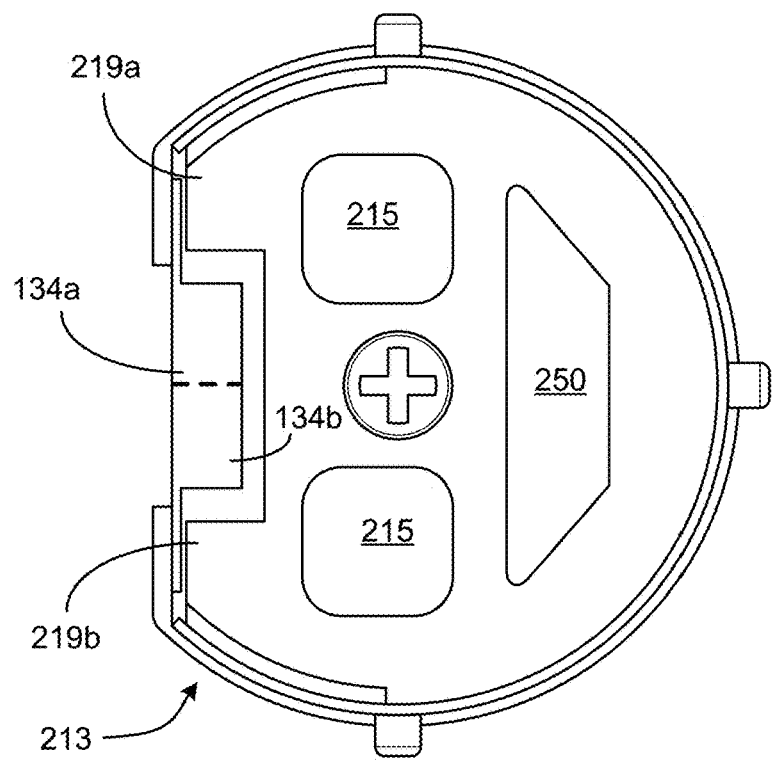
FIG. 7B is a top view of the plug member of FIG. 7A

Referring to FIGS. 7A and 7B, the robot 100 includes a plug 213 coupled to an inner surface of the flexible member 106. The flexible member 106 is wrapped round the plug 213. The plug 213 is attached to the distal portion 120 of the flexible member 106. The plug 213 includes openings 215 to which the rigid nest 211 for the image capture device 102 is mounted, as well as an opening 250 through which the cable 138 (shown in FIG. 4B) is routed. The inner surface of the flexible member 106 is bonded to a lateral surface of the plug 213 along at least 80% of an inner perimeter of the distal portion 120, e.g., along at least 85%, 90%, or 95% of the inner perimeter of the distal portion 120. The plug 213, by being bonded to the flexible member 106 and maintaining a cross-sectional shape of the flexible member 106 at the distal portion 120, can increase a torsional stiffness of the assembly including the flexible member 106 and the plug 213. The flexible member 106 can thus be less susceptible to twisting. The lateral surface of the plug 213 includes flat sections 219a, 219b and a curled section 252, the flat sections 219a, 219b for attaching to the fabric portions 128a, 128b of the flexible member 106, respectively, and the curled section 252 for attaching to the polymer section 130. The plug 213 further includes a recess 239 between the flat sections 219a, 219b to accommodate the fastener portions 134a, 134b of the flexible member 106. Proximate the plug 213, the flexible member 106 is thus in the curled configuration.

A coiling mechanism of the robot 100 can drive the flexible member 106 such that a lengthwise section of the flexible member 106 transitions from a curled configuration to a flattened configuration or from the flattened configuration to the curled configuration. The coiling mechanism includes the spool assembly 200, the drive roller assembly 202, the compressing rollers 204a, 204b, and the routing roller 207. In the example depicted in FIGS. 6A, 6B, the spool assembly 200, the drive roller assembly 202, the compressing rollers 204a, 204b, and the routing roller 207 are rotatable about axes parallel to one another. In other implementations, these assemblies and components may be rotatable about axes, some of which are nonparallel to one another and some of which are parallel to one another.

Figure 8A:
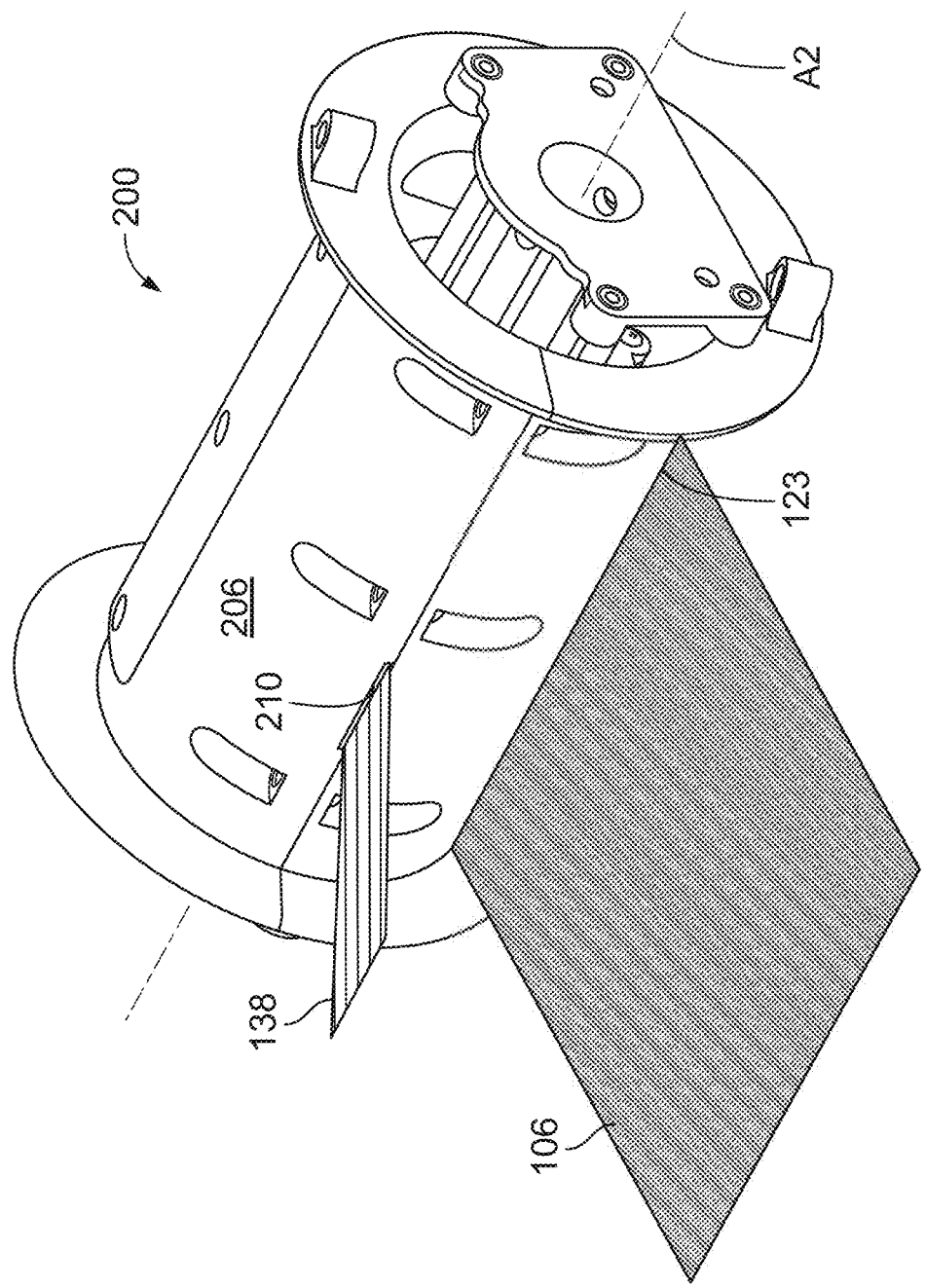
FIGS. 8A-8D are perspective, perspective exploded, front cross-sectional, and side cross-sectional views, respectively, of a spool assembly of the mast system of FIG. 4A.
Figure 8B:
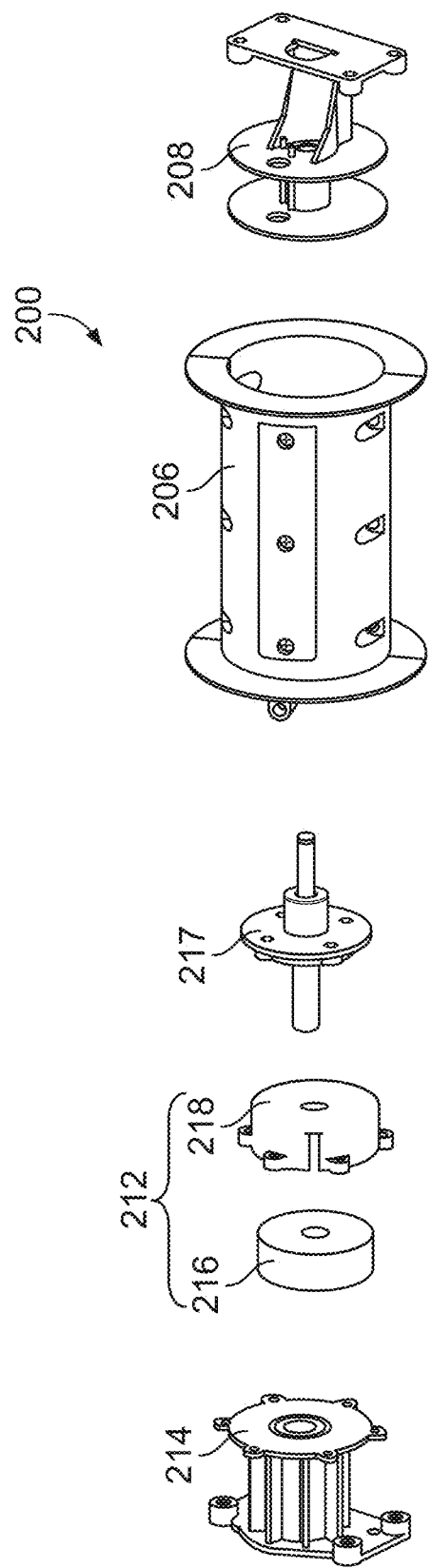
Figure 8C:
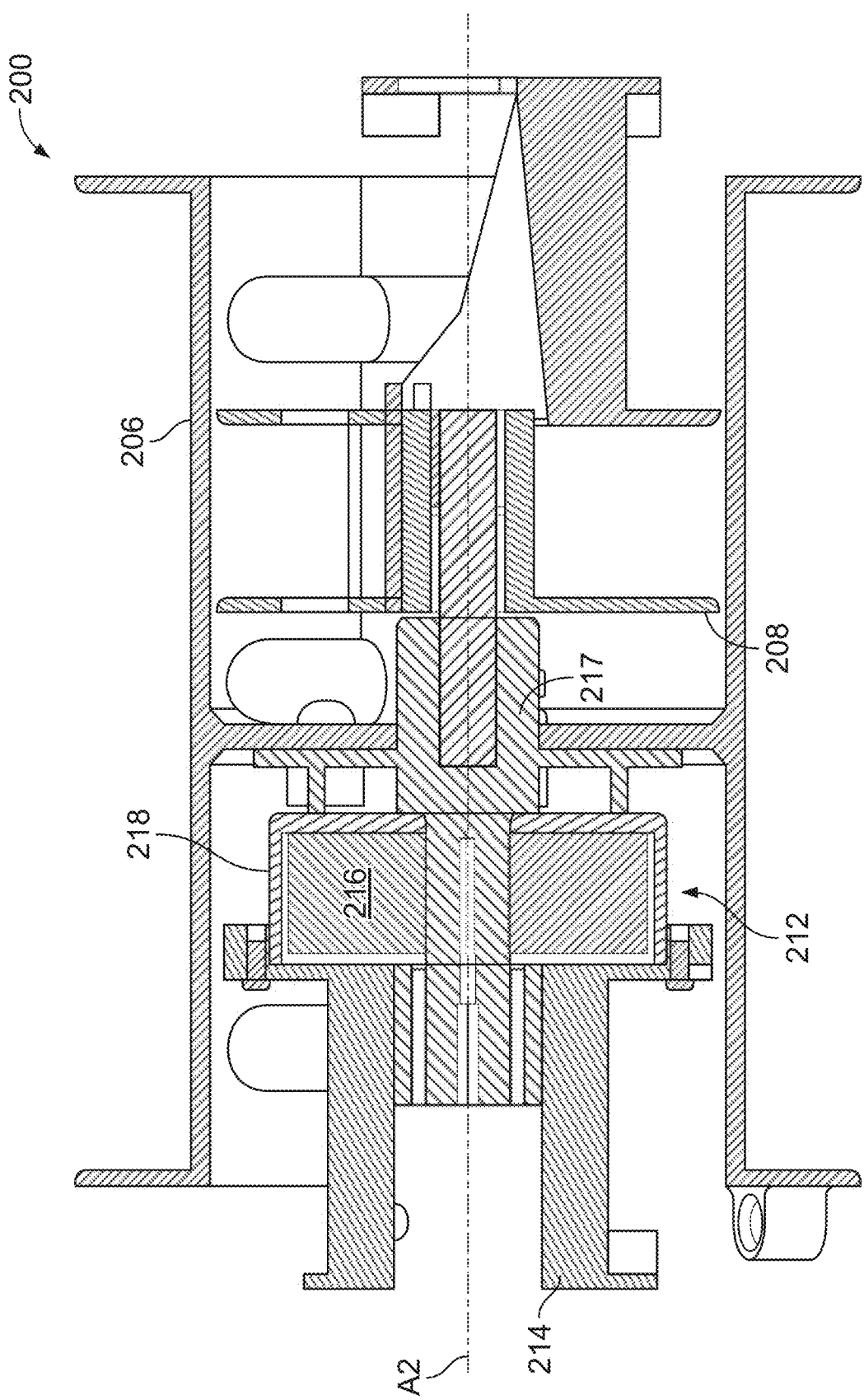

Referring also to FIG. 8A, the cable 138 is coiled when the flexible member 106 is coiled about the spool assembly 200, and is uncoiled when the flexible member 106 is uncoiled from the spool assembly 200. Referring to FIGS. 8B and 8C, the flexible member 106 and the cable 138 are separately spooled about the spool assembly 200, with the flexible member 106 being coiled about an outer portion of the spool assembly 200 and the cable 138 being coiled about an inner portion of the spool assembly 200. The flexible member 106 is coiled about an outer spool 206, and the cable 138 is coiled about an inner spool 208. The inner spool 208 is telescoped within the outer spool 206. The inner spool 208 and the outer spool 206 are concentric. For example, a central axis of the outer spool 206 is coincident with a central axis of the inner spool 208. These central axes correspond to a rotational axis A2 of the spool assembly 200.

An outer surface of the outer spool 206 about which the flexible member 106 is coiled has a diameter D1 (shown in FIG. 8D) between 40 and 80 mm, e.g., between 45 mm and 75 mm, 50 and 70 mm, or 55 and 65 mm. An outer surface of the inner spool 208 about which the cable 138 is coiled has a diameter D2 (shown in FIG. 8D) between 5 and 30 mm, e.g., between 5 and 20 mm, 10 and 25 mm, or 15 and 30 mm. The diameter D2 is between 10% and 50% of the diameter D1, e.g., between 10% and 35%, 15% and 40%, 20% and 45%, or 25% and 50% of the width W4 of the conduit 136.

The cable 138 is routed through an opening 210 (shown in FIG. 8A) along the outer spool 206. The opening 210 provides the cable 138 with access to an interior of the spool assembly 200 where the inner spool 208 is located. For example, the opening 210 is a slit on the outer spool 206 extending parallel to the rotational axis A2. The cable 138 extends through the opening 210 to engage the inner spool 208.

The inner spool 208 is fixed to the body 108 of the robot 100. The spool assembly 200 includes a spring assembly 212. The spring assembly 212 includes a spring 216 positioned within a housing 218 fixed to a mounting device 214 fixed to the body 108 (not shown) of the robot 100. In some examples, the spring 216 is a clock spring or other spring that is energized in response to rotation. The spring 216 has a first end coupled to the housing 218 or the mounting device 214 and a second end coupled to a drive axle 217.

The drive axle 217 is rotatable relative to the inner spool 208 and is rotationally coupled to the outer spool 206. As a result, the spring 216 is arranged to bias the drive axle 217, cause rotation of the drive axle 217, and thereby cause rotation of the outer spool 206. The spring 216 is also configured to be tensioned in response to rotation of the drive axle 217. The drive axle 217 has a first end rotatably coupled to the spring assembly 212 and a second end rotatably coupled to the inner spool 208. The outer spool 206 is rotationally coupled to the drive axle 217 at a center portion of the drive axle 217. As a result, the spring 216 is tensioned when the outer spool 206 is rotated in a first direction and is configured to rotate the outer spool 206 in a second direction when the spring 216 is released. During protraction, the outer spool 206 rotates relative to the inner spool 208 in the first direction to feed out the flexible member 106. During retraction, the outer spool 206 rotates relative to the inner spool 208 in the second direction to draw in the flexible member 106 and wind the flexible member 106 about the outer spool 206.

Figure 8D:
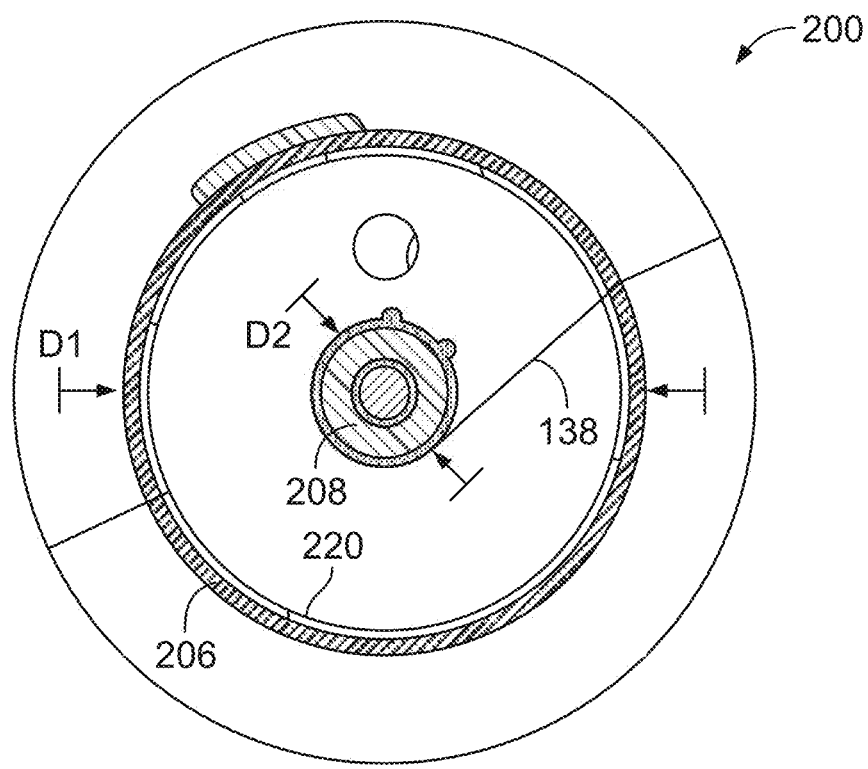

Referring to FIG. 8D, the cable 138 is contained within the outer spool 206 when coiled within the body 108 (not shown). During protraction, the cable 138 is fed out of the outer spool 206 through rotation of the outer spool 206 as an inner surface 220 of the outer spool 206 contacts the cable 138. This contact ensures that the cable 138 is driven by rotation of the outer spool 206. During retraction, the cable 138 is drawn into the outer spool 206 through rotation of the outer spool 206 and is wound about the inner spool 208 due to contact between the cable 138 and the inner surface 220 of the outer spool 206.

The cable 138 and the flexible member 106 are attached to the spool assembly 200 such that a tension in the flexible member 106 is greater than a tension in the cable 138. For example, the cable 138 is slack while the flexible member 106 is taut. By being slack, the cable 138 can be less prone to damage when the flexible member 106 is protracted and retracted. When the flexible member 106 and the cable 138 are coiled about the spool assembly 200, the flexible member 106 is wound more tightly around the outer spool 206 than the cable 138 is wound about the inner spool 208. In some examples, the cable 138, when coiled about the inner spool 208, is arranged around the inner spool 208 such that the cable 138 follows a path along the inner surface 220 of the outer spool 206 facing the inner spool 208. Slack in the cable 138 can cause the cable 138 to be biased radially outward from the inner spool 208. As a result, the cable 138 contacts the inner surface 220 of the outer spool 206 when the cable 138 is coiled about the inner spool 208. This contact can provide friction between the outer spool 206 and the cable 138 so that rotation of the outer spool 206 causes the cable 138 to be coiled or uncoiled.

Figure 9A:
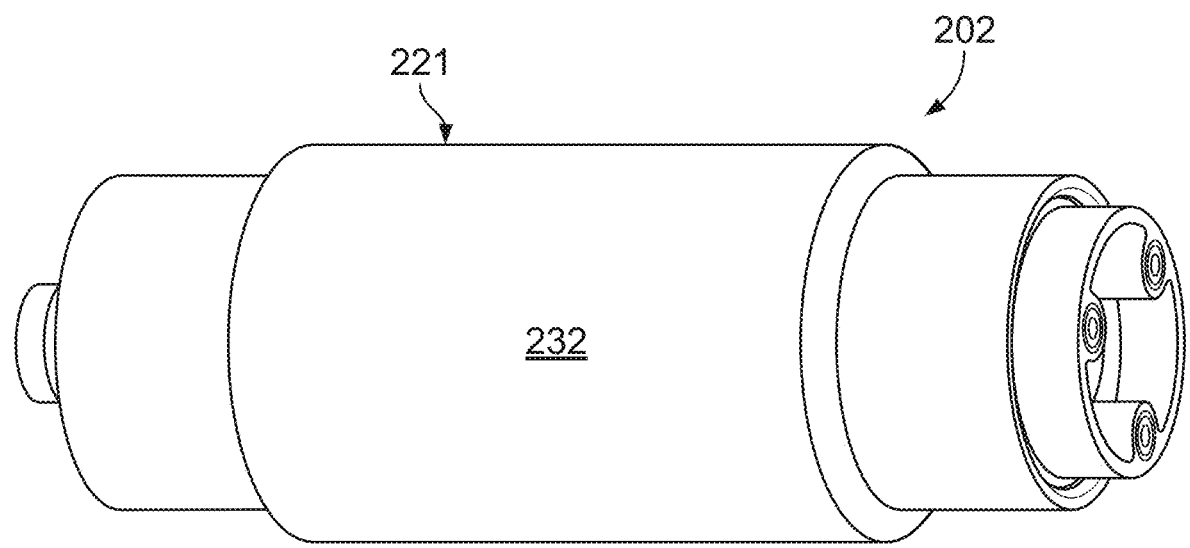

Referring to FIG. 9A, the drive roller assembly 202 includes a drive roller 221 rotatable to coil or uncoil the flexible member 106 and the cable 138. The flexible member 106 is routed along an outer surface 232 of the drive roller 221. Referring to FIGS. 9B and 9C, the drive roller assembly 202 includes a motor 222 operable to rotate the drive roller 221. The motor 222 is positioned within drive roller 221. This can reduce the amount of space in the body 108 required for housing the drive roller assembly 202. The drive roller assembly 202 further includes a motor mount 224 positioned on one end of the drive roller 221. The motor mount 224 is configured to mount the motor 222 to the body 108 of the robot 100. The drive roller assembly 202 also includes a bearing 226 positioned on the motor mount 224 to allow for rotation between the drive roller 221 and the motor mount 224. A drive coupler 228 of the drive roller assembly 202 couples a shaft 230 of the motor 222 to the drive roller 221. The drive coupler 228 thus enables rotation of the motor shaft 230 to cause rotation of drive roller 221.

The motor 222 is operably connected to the controller 114 so that the controller 114 can control rotation of the motor 222 and thereby control a height of the image capture device 102. In particular, the controller 114 operates the motor 222 to control an amount of the flexible member 106 that is protracted from the body 108 of the robot 100. The protracted amount defines the height of the image capture device 102 above the floor surface.

The motor 222 is configured to be driven to rotate the motor shaft 230 and hence the drive roller 221 is in a first direction, e.g., clockwise in the perspective as shown in FIG. 6B, to cause the flexible member 106 and the cable 138 to be uncoiled from the spool assembly 200. Referring back to FIGS. 6A and 6B, the compressing rollers 204a, 204b can be passive rollers that are not mechanically driven by, for example, a motor or other actuator. The compressing rollers 204a, 204b compress a portion of the flexible member 106 against the drive roller 221 to maintain contact between the flexible member 106 and the outer surface 232 of the drive roller 221 when the drive roller 221 is rotated. The compressing rollers 204a, 204b provide a normal force on the flexible member 106 against the drive roller 221, thereby providing friction between the flexible member 106 and the drive roller 221. The flexible member 106 contacts outer surfaces of the compressing rollers 204a, 204b, and the compressing rollers 204a, 204b apply forces on the flexible member 106 and presses the flexible member 106 against the outer surface 232 of the drive roller 221 to prevent the flexible member 106 from moving away from the outer surface 232 of the drive roller 221.

In some implementations, the robot 100 comprises one or more springs mounting the compressing rollers 204a, 204b to a chassis or other structure of the robot 100. The robot 100 for example can include springs mounting the compressing rollers 204a, 204b, respectively, to other structures of the robot 100. The compressing rollers 204a, 204b, by being spring-mounted, can thus apply a sufficient normal force to ensure contact between the drive roller 221 and the flexible member 106. This ensures that rotation of the drive roller 221 applies a force to the flexible member 106 to uncoil the flexible member 106 from the spool assembly 200. The force generates tension in the flexible member 106 that drives the spool assembly 200 to rotate and thereby release spooled portions of the flexible member 106.

The robot 100 can also include the routing roller 207. The routing roller 207 is positioned proximate the ramp 203 and contacts the lengthwise section 140b of the flexible member 106 (shown in FIG. 5). The routing roller 207 contacts the lengthwise section 140b to prevent the lengthwise section 140b from moving away from the ramp 203 as the flexible member 106 is extended from or retracted into the body 108 of the robot 100. The routing roller 207 includes frustoconical members 225a, 225b at least partially defining an outer surface of the routing roller 207. The frustoconical members 225a, 225b are positioned such that tapers of the frustoconical members 225a, 225b are directly inwardly toward a center of the routing roller 207. The frustoconical members 225a, 225b are positioned to contact lateral portions of the polymer layer 130. The frustoconical members 225a, 225b can be elastomeric to provide a force to press the flexible member 106 against the ramp 203 without impeding longitudinal movement of the flexible member 106 as the flexible member 106 is extended from or retracted into the body 108 of the robot 100. The frustoconical members 225a, 225b can further mitigate a risk of buckling of the flexible member 106. In some implementations, the routing roller 207 includes an elongate member (e.g., a rod or other elongate member), and the frustoconical members 225a, 225b are rotatable about the elongate member of the routing roller 207.

The motor 222 is also configured to be driven to rotate the motor shaft 230 and hence the drive roller 221 in a second direction, e.g., counterclockwise in the perspective as shown in FIG. 6B, to cause the flexible member 106 and the cable 138 to be coiled about the spool assembly 200. Rotation of the drive roller 221 applies a force to a portion of the flexible member 106 that moves the portion of the flexible member 106 toward the spool assembly 200. The drive roller 221 feeds the portion of the flexible member 106 to the spool assembly 200. The spring 216 rotates the spool assembly 200 to draw in the portion of the flexible member 106 as the drive roller 221 feeds the portion of the flexible member 106 to the spool assembly 200. In this regard, the spring 216 allows for a non-motorized way of rotating the spool assembly 200.

To control the height to which the distal portion 120 of the flexible member 106 is extended, the robot 100 can monitor the position of the flexible member 106 during retraction and protraction of the flexible member 106. The robot 100 includes a sensor to detect motion of the flexible member 106 as the flexible member 106 is coiled and uncoiled. The controller 114 is configured to determine a length of an uncoiled portion or a length of a coiled portion of the flexible member 106 based on the motion of the flexible member 106 detected by the sensor. For example, an encoder associated with the motor 222 measures the amount of the flexible member 106 fed out of or drawn into the spool assembly 200. Alternatively or additionally, the sensor includes an optical sensor 209 (shown in FIG. 6B) positioned to detect motion of the flexible member 106 as the flexible member 106 is fed out of the body 108 or drawn into the body 108. The optical sensor 209 is an optical motion sensor that tracks cumulative motions of the flexible member 106. The controller 114 is configured to determine the height of the distal portion 120 of the flexible member 106 based on this tracked motion.

The robot 100 can include other mechanisms for tracking motion of the flexible member 106. In some implementations, referring to FIG. 10, the flexible member 106 can include a metallic layer 234 longitudinally extending along the flexible member 106. The robot 100 includes a sensor 235 (shown in FIG. 6B) for detecting the metallic layer 234. The sensor 235 is positioned within the body 108 of the robot 100 and is positioned to detect a magnetic field proximate the flexible member 106 and, in particular, proximate the metallic layer 234. For example, the sensor 235 can include a Hall Effect sensor 236 configured to detect an amount of metal material proximate the sensor 235, and a magnet 251 (shown in FIG. 6B) that produces a magnetic field with a magnitude varying with the amount of metal material proximate the magnet 251. The metallic layer 234 can be arranged in a pattern along the flexible member 106 such that the magnitude of the magnetic field of the magnet 251 varies and accordingly the readings of the Hall effect sensor 236 vary as the flexible member 106 is extended from or retracted into the body 108 of the robot 100. The Hall effect sensor 236 produces a signal whose magnitude varies according to the magnitude of the magnetic field of the magnet 251.

The metallic layer 234 can be bonded to the polymer layer 130. In some implementations, the metallic layer 234 is bonded to an inner surface of the polymer layer 130. For example, the metallic layer 234 can be a metallic film bonded to the polymer layer 130. In some implementations, the metallic layer 234 is positioned between the polymer layer 130 and another polymer layer. The metallic layer 234 is sandwiched between the polymer layer 130 and the other polymer layer.

Figure 10:
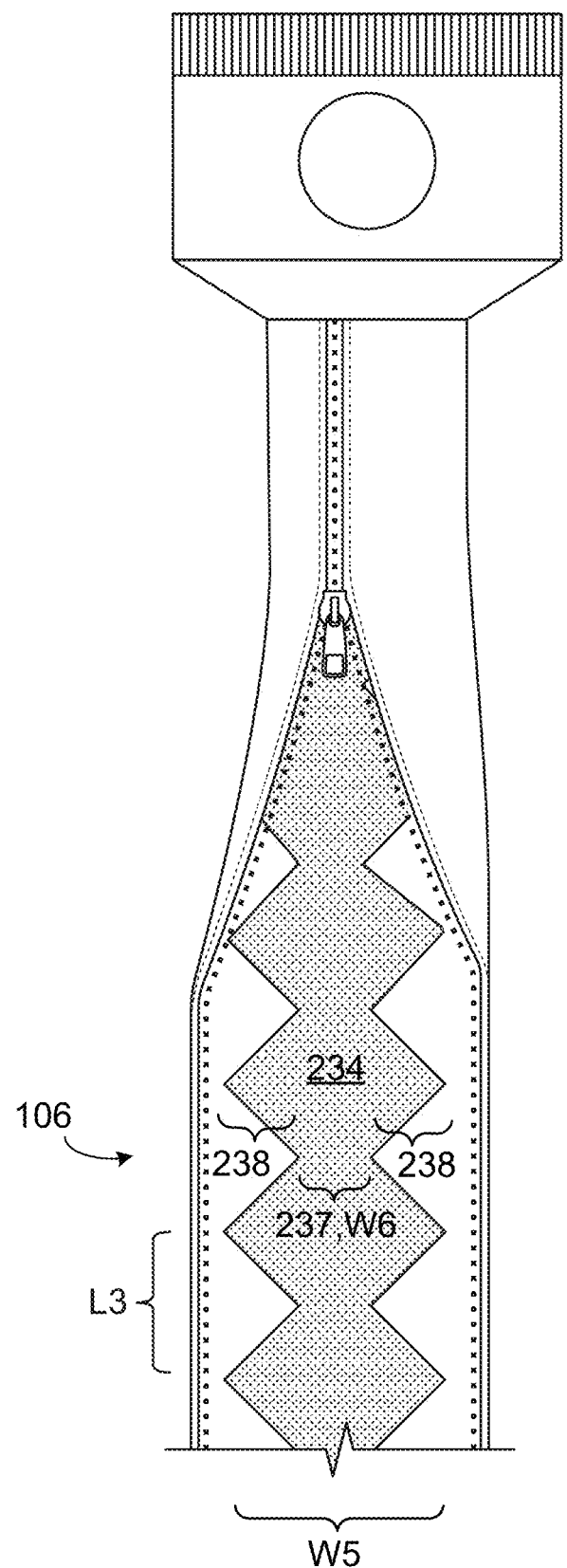
FIG. 10 is a front view of an elongate flexible member with a metallized film.

In the example shown in FIG. 10, a width of the metallic layer 234 varies longitudinally along the flexible member. A maximum width W5 of the metallic layer 234 is between 2 and 10 centimeters, e.g., between 2 and 6 centimeters, 4 and 8 centimeters, or 6 and 10 centimeters. A minimum width W6 of the metallic layer 234 is between 0.1 and 5 centimeters, e.g., between 0.1 and 3 centimeters, 1 and 4 centimeters, or 2 and 5 centimeters. The metallic layer 234 includes a central portion 237 having a uniform with, i.e., the minimum width W6. The metallic layer 234 further includes triangular lateral portions 238.

The sensor 235 is configured to produce a signal in response to detecting the metallic layer 234 as the metallic layer 234 moves relative to the sensor 235. As the metallic layer 234 moves relative to the sensor 235, the portion of the signal representing detection of the central portion 237 does not vary significantly when the flexible member 106 is functioning properly because the minimum width W6 of the central portion 237 of the metallic layer 234 does not vary longitudinally. The portion of the signal representing detection of the central portion 237 only varies in response to the flexible member 106 moving away from the sensor 235, e.g., due to buckling or lateral movement of the flexible member 106. Because the width of the lateral portions 238 vary longitudinally, the portion of the signal representing detection of the lateral portions 238 varies as the flexible member 106 extends from or retracts into the body 108 of the robot 100. When the flexible member 106 is functioning properly, the portion of the signal representing detection of the lateral portions 238 predictably varies. For example, the portion of the signal includes peaks as a segment 240 of the lateral portions 238 having the maximum width W5 passes the sensor 235. Based on a distance L3 between segments 240 having the maximum width W5, the controller 114 of the robot 100 (shown in FIG. 3A) can thus determine a distance travelled by the flexible member 106 and a distance travelled by the distal portion 120 of the robot 100.

In some implementations, the flexible member 106 can include a metallic member proximate the distal portion 120 (shown in FIG. 3D). A magnitude of the signal produced by the sensor 235 in response to detecting the metallic member can be greater than a magnitude of the signal produced by the sensor 235 in response to detecting the metallic layer 234. Upon the sensor 235 detecting the metallic member, the controller 114 determines that the flexible member 106 is retracted fully and thus can stop further retraction of the flexible member 106.

The pattern of the metallic layer 234 can vary in implementations. In some implementations, a first portion of the metallic layer 234 having a first width can extend along 30% to 90% of a length of the flexible member 106, and can have a second portion of the metallic layer 234 having a second width greater than the first width can be extend along no more than 10% of the length of the flexible member 106. The second width can correspond to an end portion of the metallic layer 234 and can further be positioned such that the Hall effect sensor 235 is proximate the second portion of the metallic layer 234 when the flexible member 106 is fully retracted, fully extended, nearly fully retracted (e.g., when the distal portion 120 of the flexible member 106 is within 1 to 5 centimeters of the flexible member 106 in its proximal most position), or nearly fully extended (e.g., when the distal portion 120 of the flexible member 106 is within 1 to 5 centimeters of the flexible member 106 in its distal most position). Variations in the signal generated by the sensor 235 when the metallic layer 234 is proximate the magnet 251 can be indicative of lateral movement of the flexible member 106. A large variation when the first portion of the metallic layer 234 is proximate the sensor 235 can indicate that the flexible member 106 is not functioning properly. Detection of the second portion of the metallic layer 234 can indicate that the flexible member 106 is fully extended, fully retracted, nearly fully extended, or nearly fully retracted.

In some implementations, rather than or in addition to a width of the metallic layer 234 varying along a length of the flexible member 106, a thickness of the metallic layer 234 can vary. In some implementations, a first portion of the metallic layer 234 has a first thickness between 0.01 and 1 mm, and a second portion of the metallic layer 234 has a second thickness that is 1.2 to 4 times greater than the first thickness. In some implementations, the metallic layer 234 covers no less than 90% of an inner surface of the conduit 136. In implementations in which the metallic layer 234 has a uniform width, the sensor 235 can generate a signal indicative of whether the flexible member 106 is functioning properly.

Further Implementations

A number of implementations have been described. Nevertheless, it will be understood that various modifications may be made.

In some implementations, the polymer layer 130 is preformed such that a radius of curvature of the polymer layer 130 in an unstressed state is between 10 and 60 millimeters, e.g., between 10 and 30 millimeters, 20 and 40 millimeters, 30 and 50 millimeters, or 40 and 60 millimeters. The pre-formed curvature of the polymer layer 130 can reduce a likelihood that the polymer layer 130 buckles as the polymer layer 130 is deflected from the flattened configuration to the curved configuration.

Alternatively, the zipper mechanism corresponds to a zipper mechanism for connecting plastic materials. The zipper mechanism includes interlocking plastic material for connecting the lateral edges 132a, 132b. The zipper mechanism includes a first portion that press-fits into a second portion, the first portion corresponding to one of the fastener portions 134a, 134b and the second portion corresponding to the other of the fastener portions 134a, 134b. In some examples of such zipper mechanisms, the zipper mechanism includes a ridge (e.g., the fastener portion 134a) along one of the lateral edges 132a, 132b and a cavity (e.g., the fastener portion 134b) along the other of the lateral edges 132a, 132b. The lateral edges 132a, 132b are connected to one another when the cavity receives the ridge and thereby forms a press-fit connection with the ridge.

Alternatively, the fastener portions 134a, 134b are affixed or fastened to one another through a hook-and-loop mechanism, with one of the fastener portions 134a, 134b including hook-engageable material and the other of the fastener portions 134a, 134b including hooks. In some implementations, the fastener portions 134a, 134b include magnetically attractive material. The fastener portions 134a, 134b are magnetically attracted to one another and thus join the lateral edges 132a, 132b when the fastener portions 134a, 134b are brought in close proximity to one another.

For example, in some implementations, the environment 10 includes one or more enclosed spaces such as a set of multiple rooms or spaces defined by a structure or a building, e.g., a home, a residential dwelling, a single family home, a multi-family dwelling, a unit of a duplex, apartment, or condominium, a mobile home, or a commercial living space, an office, a studio, a manufacturing plant, etc.

In some implementations, data indicative of the digital imagery generated by the image capture device 102 is transmitted to a remote computing device. The remote computing device, in some cases, includes a display to present the digital imagery to a user so that the user can monitor an object captured in the digital imagery. Alternatively or additionally, data representing the captured images and/or detected conditions are transmitted to a network, e.g., the Internet. The data are accessible by a user terminal through a portal on the network. The user terminal is operable to present views of the enclosure space formed from imagery captured by the robot from multiple locations and directions. The views include views of the enclosure space from multiple vantage points to provide the user with a visual representation of surroundings of the robot within the enclosure space.

The flexible member 106 is described as being movable vertically away from the body 108 of the robot 100. In some implementations, the flexible member 106 is movable both vertically and horizontally away from the body 108 of the robot 100. In this regard, rather than moving only along a vertical axis away from the floor surface 20, the image capture device 102 moves along an axis at a non-perpendicular angle relative to the floor surface 20. In some implementations, rather than moving vertically away from the body 108 of the robot 100, the image capture device 102 is moved horizontally away from the body 108 of the robot 100. This type of movement allows the image capture device 102 to be repositioned to capture imagery in areas that the robot 100 cannot reach through movement along the floor surface 20, e.g., under furniture, around corners, etc.

The fastener portions 134a, 134b are described as being attached to the outer layer 128. In some implementations, the fastener portions 134a, 134b are integral to the outer layer 128. The fastener portions 134a, 134b are formed from the same material that forms the outer layer 128. For example, if the outer layer 128 is formed from a flexible polymer, the fastener portions 134a, 134b correspond to, in some cases, plastic features that, when mated with one another, connect lateral ends of the outer layer 128.

Alternatively or additionally, while both an inner layer 130 and an outer layer 128 are described, in some implementations, only one of the outer layer 128 and the inner layer 130 is present. In such cases, the flexible member 106 includes a single layer configured to be curled about the longitudinal axis and configured to support the image capture device 102. In addition, the single layer includes, in some cases, integral fastener portions 134a, 134b.

While the cable 138 is described as a ribbon cable, in some implementations, rather than a single electronics cable extending between the body 108 and the image capture device 102, multiple cables are present. For example, the robot 100 includes a data communication cable separate from a power delivery cable. The data communication cable and the power delivery cable are spooled about a single spool, e.g., the inner spool 208. Alternatively, the data communication cable and the power delivery cable are each spooled about its own distinct spool, e.g., positioned within the outer spool 206.

While the image capture device 102 is described to be supported by the distal portion 120 of the flexible member 106, in some implementations, another sensor is supported by the distal portion 120. The sensor provides a measurement that varies with location within the environment 10, e.g., varying with height and floor surface location. For example, the sensor includes one or more of a temperature sensor that measures a temperature within the environment 10, a moisture sensor that measures a moisture content of the environment 10, a pressure sensor such a barometer that measures a barometric pressure of the environment 10, an air quality sensor that measures an air quality of the environment 10, or a light sensor to detect ambient light in the environment 10.

In some implementations, rather than or in addition to including a sensor, the distal portion 120 of the flexible member 106 includes a mechanical end effector, such as a gripper, a suction cup, a rotatable member, or other end effector. The end effector is controllable by the controller 114 to perform an operation in the environment 10 in which the end effector interacts with an object in the environment 10. For example, if the mechanical end effector is a gripper, the end effector is operable to grasp an object, and the robot 100 is movable to reposition the grasped object in the environment 10.

While the cable 138 is described as an electrical cable, in some implementations, the cable 138 enables transmission of data or power through another medium. For example, cable 138 can be an optical cable that enables transmission of an optical signal indicative of data to be transmitted from the image capture device 102 to the controller 114.

Alternatively or additionally, the image capture device 102 is electrically isolated from the controller 114, and the cable 138 is absent. The image capture device 102 is powered by a battery supported by the distal portion 120 of the flexible member 106 and communicates data wirelessly to the controller 114. The image capture device 102 is operated by the controller 114 by receiving wireless command signals from the controller 114. In this regard, only the flexible member 106 is spooled about the spool assembly 200. Such examples can simplify the mast system 104, as only a single member, e.g., the flexible member 106, rather than multiple members, e.g., the flexible member 106 and the cable 138, is coiled and uncoiled to move the image capture device 102 vertically.

While two compressing rollers 204a, 204b are shown, in some implementations, a single compressing roller is present. For example, the compressing roller 204a proximate the ramp 203 is present while the compressing roller 204b is absent. This can further reduce the amount of space occupied by the mast system 104. Alternatively or additionally, two or more compressing rollers are used to compress the flexible member 106 against the drive roller assembly 202. Furthermore, while elements 204a, 204b are described as being compressing rollers 204a, 204b, in some implementations, the elements 204a, 204b are elongate members. The elements 204a, 204b do not rotate and are fixed in place. The elements 204a, 204b guide the flexible member 106a along a path around the outer surface 232 of the drive roller 221. And in some implementations, the robot 100 only includes a single element 204a or 204b to guide the flexile member 106a along the path around the outer surface 232 of the drive roller 221. The elements 204a, 204b can be fixed rods. In some implementations, a front one of the elements 204a, 204b is a rotatable roller that is spring-mounted, and a rear one of the elements 204a, 204b is a fixed elongate member that is not rotatable. The routing roller 207, as described herein, can include an elongate member configured not to rotate, and the frustoconical members 225a, 225b can be configured to rotate about the elongate member.

While a single spool assembly 200 is described and shown, in some implementations, the mast system 104 includes two or more distinct spool assemblies. For example, rather than being telescoped within the spool 206, the spool 208 is separate from the spool 206 and positioned outside of the spool 206. Corresponding springs, e.g., similar to the spring 216, are coupled to the spools 206, 208.

In addition, while the cable 138 and the flexible member 106 are described as being coiled about spools within the robot 100, in some implementations, the cable 138 or the flexible member 106 is stored in another configuration within the robot 100. For example, the flexible member 106 or the cable 138 is folded within a confined space in the body 108 of the robot 100.

While the spring 216 is described as providing torque to drive the spool assembly 200 for retraction of the flexible member 106 and the cable 138, in some implementations, another energy source is used to provide the torque. For example, the robot 100 includes another motor distinct from the motor 222. This other motor is configured to drive the outer spool 206 of the spool assembly 200 so that the outer spool 206 is rotated during retraction of the flexible member 106. Alternatively, the motor 222 is connected through a transmission system to the spool assembly 200. In this regard, the motor 222, when driven, causes rotation of the both the drive roller 202 and the outer spool 206.

While described as being usable with an autonomous mobile robot, in some implementations, the mast system 104 is usable with other devices in which a portion of the device is protractible or retractable. For example, in some implementations, the mast system 104 is part of a stationary support system for an image capture device, such as a tripod or monopod. In some implementations, the mast system 104 is part of a stationary image capture system mounted to the environment 10, e.g., for a home security system or commercial security system. In some implementations, the payload is a device other than an image capture device. For example, the mast system 104 may raise and lower devices during use and non-use states. For example, the mast system 104 may be part of a mobile or stationary apparatus or system that raises and lowers a wireless router or router repeater dynamically to improve signal strength within an environment when and where weaknesses are detected. In some implementations, the mast system 104 may be a stand-alone system for providing a retractable, protractible support mast for a payload.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

Accordingly, other implementations are within the scope of the claims.

What is claimed is:

1. An autonomous mobile robot comprising:
a body;
a drive to maneuver the body across a floor surface;
an image capture device; and
an elongate flexible member comprising
a polymer layer forming a central portion of the flexible member, the polymer layer extending along an entire length of the flexible member,
first and second fabric portions forming lateral portions of the flexible member, the first and second fabric portions extending along first and second lateral edges, respectively, of the polymer layer,
a first portion of a fastening mechanism extending along a lateral edge of the first fabric portion and a second portion of the fastening mechanism extending along a lateral edge of the second fabric portion, wherein the first portion of the fastening mechanism is directly attached to the second portion of the fastening mechanism to connect the lateral edge of the first fabric portion and the lateral edge of the second fabric portion such that the first and second fabric portions, the polymer layer, and the fastening mechanism form a conduit to support the image capture device, the conduit comprising an inner surface and an outer surface, and the outer surface of the conduit being defined by the polymer layer, the first and second fabric portions, and the fastening mechanism, and
an end portion vertically movable away from the body, wherein the central portion is configured to deflect such that the lateral edges of the first and second fabric portions are moved toward one another as the end portion of the flexible member moves away from the body, and wherein the image capture device is mounted to the end portion of the flexible member such that the image capture device moves vertically away from the body as the end portion moves vertically away from the body,
wherein a perimeter of a cross section of the conduit comprises a first segment and a second segment, the first segment comprising a first end connected to a first end of the second segment and a second end connected to a second end of the second segment, wherein the second segment has a curvature more than a curvature of the first segment, and wherein the polymer layer extends along the second segment.

2. The robot of claim 1, wherein:
the end portion is a first end portion, and the flexible member comprises a second end portion attached to a spool within the body of the robot, the flexible member configured to be coiled onto the spool as the first end portion moves vertically toward the body, and
the central portion is configured to deflect such that the lateral edges of the first and second fabric portions are moved away from one another as the first end portion of the flexible member moves vertically toward the body.

3. The robot of claim 1, wherein a section of the flexible member is deflectable between a flattened configuration in which the lateral portions of the flexible member along the section are separated from one another by the central portion of the flexible member along the section and a curled configuration in which the lateral portions of the flexible member are attached to one another.

4. The robot of claim 1, wherein the flexible member comprises a transition region comprising a first end in which the first and second portions of the fastening mechanism are attached to one another and a second end in which the first and second portions of the fastening mechanism are separated from one another by at least a width of the polymer layer,
wherein a distance between the first and second portions of the fastening mechanism decreases and a curvature of the polymer layer increases from the first end of the transition region to the second end of the transition region.

5. The robot of claim 1, wherein the polymer layer extends along 50% to 90% of a width of the flexible member.

6. The robot of claim 1, wherein the first and second fabric portions extending along no more than 20% of a width of the flexible member.

7. The robot of claim 1, wherein the first and second fabric portions are sewed to the polymer layer along the first and second lateral edges of the polymer layer, respectively, of the polymer layer.

8. The robot of claim 7, wherein:
the first fabric portion is sewed to the polymer layer such that an outer surface of the first fabric portion at least partially defining the outer surface of the conduit faces the outer surface of the polymer layer, and
the second fabric portion is sewed to the polymer layer such that an outer surface of the second fabric portion at least partially defining the outer surface of the conduit faces the outer surface of the polymer layer.

9. The robot of claim 1, wherein the flexible member comprises a metallic layer longitudinally extending along the flexible member, wherein the robot comprises a sensor to detect the metallic layer.

10. The robot of claim 9, wherein the sensor comprises a Hall effect sensor.

11. The robot of claim 9, wherein a width of the metallic layer varies longitudinally along the flexible member.

12. The robot of claim 11, wherein a maximum width of the metallic layer is between 2 and 10 centimeters, and a minimum width of the metallic layer is between 0.1 and 5 centimeters.

13. The robot of claim 9, wherein the polymer layer is a first polymer layer, the flexible member further comprises a second polymer layer underlying the first polymer layer, and the metallic layer is positioned between the first polymer layer and the second polymer layer.

14. The robot of claim 9, wherein an inner surface of the conduit is at least partially defined by the metallic layer, the metallic layer being a metallic film bonded to the polymer layer.

15. The robot of claim 9, wherein a width or a pattern of the metallic layer is indicative of a distance travelled by the end portion of the flexible member based on the detected metallic layer.

16. The robot of claim 1, wherein the polymer layer of the flexible member comprises woven polymer fibers.

17. The robot of claim 1, wherein the polymer layer is pre-formed such that a radius of curvature of the polymer layer in an unstressed state is between 10 and 60 millimeters.

18. The robot of claim 1, wherein the fastening mechanism comprises a zipper mechanism, the first portion and the second portion of the fastening mechanism corresponding to first clasps and second clasps, respectively, of the zipper mechanism.

19. The robot of claim 18, wherein a gauge size of the first and second clasps is #3, #4, #5, #6, or #7.

20. The robot of claim 1, wherein the first and second portions of the fastening mechanism are positioned along the first segment.

21. The robot of claim 1, wherein a length of the first segment is between 2 and 50 millimeters, and a length of the second segment is between 4 and 10 centimeters.

22. The robot of claim 1, wherein a length of the first segment is between 5 and 50% of a length of the perimeter of the conduit, and a length of the second segment is between 50 and 95% of the length of the perimeter of the conduit.

23. The robot of claim 1, further comprising a passive roller comprising a frustoconical member at least partially defining an outer surface of the passive roller along which the flexible member is routed.

24. The robot of claim 1, further comprising a plug attached to the end portion of the flexible member, the plug being bonded to the end portion along at least 80% of an inner perimeter of the end portion.

25. The robot of claim 1, wherein the polymer layer has a stiffness greater than a stiffness of the first and second fabric portions.

26. An autonomous mobile robot comprising:
a body;
a drive to maneuver the body across a floor surface;
an image capture device; and
an elongate flexible member comprising
a polymer layer extending along an entire length of the flexible member,
first and second fabric portions forming lateral portions of the flexible member,
a first portion of a fastening mechanism extending along a first lateral edge of the polymer layer and a second portion of the fastening mechanism extending along a second lateral edge of the polymer layer, wherein the first portion of the fastening mechanism is attached to the second portion of the fastening mechanism and forms a conduit to support the image capture device, the conduit comprising an inner surface and an outer surface, and the outer surface of the conduit being at least partially defined by the polymer layer, and
an end portion vertically movable away from the body, wherein the image capture device is mounted to the end portion of the flexible member such that the image capture device moves vertically away from the body as the end portion moves vertically away from the body,
wherein a perimeter of a cross section of the conduit comprises a first segment and a second segment, the first segment comprising a first end connected to a first end of the second segment and a second end connected to a second end of the second segment, wherein the second segment has a curvature more than a curvature of the first segment, and wherein the first and second fabric portions extend along the first segment and the polymer layer extends along the second segment.

27. The robot of claim 26, wherein the first and second fabric portions extend along no less than 90% of entire lengths of the first and second lateral edges of the polymer layer, respectively.

28. The robot of claim 26, wherein in the cross section of the conduit, the first portion of the fastening mechanism is attached to the second portion of the fastening mechanism along the first segment.

29. The robot of claim 26, wherein in the cross section of the conduit, a length of the first segment is less than an overall width of the conduit.

30. An autonomous mobile robot comprising:
a body;
a drive to maneuver the body across a floor surface;
an image capture device; and
an elongate flexible member comprising
a polymer layer forming a central portion of the flexible member, the polymer layer extending along an entire length of the flexible member,
first and second fabric portions forming lateral portions of the flexible member, the first and second fabric portions extending along first and second lateral edges, respectively, of the polymer layer, wherein the polymer layer has a stiffness greater than a stiffness of the first and second fabric portions,
a first portion of a fastening mechanism extending along a lateral edge of the first fabric portion and a second portion of the fastening mechanism extending along a lateral edge of the second fabric portion, wherein the first portion of the fastening mechanism is directly attached to the second portion of the fastening mechanism to connect the lateral edge of the first fabric portion and the lateral edge of the second fabric portion such that the first and second fabric portions, the polymer layer, and the fastening mechanism form a conduit to support the image capture device, the conduit comprising an inner surface and an outer surface, and the outer surface of the conduit being defined by the polymer layer, the first and second fabric portions, and the fastening mechanism, and
an end portion vertically movable away from the body, wherein the central portion is configured to deflect such that the lateral edges of the first and second fabric portions are moved toward one another as the end portion of the flexible member moves away from the body, and wherein the image capture device is mounted to the end portion of the flexible member such that the image capture device moves vertically away from the body as the end portion moves vertically away from the body.

31. The robot of claim 30, wherein in a cross section of the conduit, the first and second fabric portions extend along only a first portion of a perimeter of the cross section, and the polymer layer extends along only a second portion of the perimeter of the cross section.

32. The robot of claim 30, wherein in a cross section of the conduit, the first and second fabric portions form at least part of a first segment of a perimeter of the cross section between first and second ends of a second segment of the perimeter of the cross section.

33. The robot of claim 32, wherein the first segment of the perimeter of the cross section is formed at least in part by the fastener mechanism.

* * * * *